United States Patent
Koseki et al.

(10) Patent No.: US 11,349,654 B2
(45) Date of Patent: May 31, 2022

(54) RE-ENCRYPTION KEY GENERATION DEVICE, RE-ENCRYPTION DEVICE, RE-ENCRYPTED CIPHERTEXT DECRYPTION DEVICE, AND CRYPTOGRAPHIC SYSTEM

(71) Applicant: Mitsubishi Electric Corporation, Tokyo (JP)

(72) Inventors: Yoshihiro Koseki, Tokyo (JP); Yutaka Kawai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 16/605,464

(22) PCT Filed: Jun. 9, 2017

(86) PCT No.: PCT/JP2017/021477
§ 371 (c)(1),
(2) Date: Oct. 15, 2019

(87) PCT Pub. No.: WO2018/225248
PCT Pub. Date: Dec. 13, 2018

(65) Prior Publication Data
US 2021/0126782 A1    Apr. 29, 2021

(51) Int. Cl.
*H04L 9/08* (2006.01)
*H04L 9/06* (2006.01)

(52) U.S. Cl.
CPC .......... *H04L 9/0891* (2013.01); *H04L 9/0618* (2013.01); *H04L 9/0869* (2013.01)

(58) Field of Classification Search
None
See application file for complete search history.

(56) References Cited

U.S. PATENT DOCUMENTS

2008/0059787 A1\* 3/2008 Hohenberger ........ H04L 9/3073
713/153
2008/0170701 A1   7/2008 Matsuo et al.
(Continued)

FOREIGN PATENT DOCUMENTS

JP    2008-54315 A    3/2008
JP    2009-302861 A   12/2009
(Continued)

OTHER PUBLICATIONS

Kawai et al. "Fully-Anonymous Function Proxy-Re-Encryption" [online] IACR, Oct. 11, 2013 [retrieved Oct. 7, 2021]. Retrieved from the Internet: URL: https://eprint.iacr.org/2013/318.pdf (Year: 2013).\*

(Continued)

*Primary Examiner* — Taghi T Arani
*Assistant Examiner* — Joshua Raymond White
(74) *Attorney, Agent, or Firm* — Birch, Stewart, Kolasch & Birch, LLP

(57) ABSTRACT

A key generation device generates a decryption key $dk_x$ having a tag-added decryption key and a decryption key $adk_x$. The tag-added decryption key includes a decryption key $tdk_x$ in which a key attribute x is set and a tag $tg_\varphi$ required to decrypt a ciphertext with the decryption key $tdk_x$. In the decryption key $adk_x$, the key attribute x is set. An encryption device generates an original ciphertext $oct_y$ in which a ciphertext attribute y corresponding to the key attribute x is set and which can be decrypted with the tag-added decryption key. A re-encryption key generation device encrypts the decryption key $tdk_x$ by an attribute-based encryption scheme using a ciphertext attribute y', so as to generate a re-encryption key $rk_{x,y'}$ which is a key for generating a re-encrypted ciphertext $rct_{y'}$ which can be (Continued)

decrypted with a decryption key $adk_{x'}$, in which a key attribute x' corresponding to the ciphertext attribute y' is set.

11 Claims, 20 Drawing Sheets

(56) References Cited

U.S. PATENT DOCUMENTS

| | | | | |
|---|---|---|---|---|
| 2012/0300936 | A1* | 11/2012 | Green | H04L 9/088 380/278 |
| 2015/0180661 | A1 | 6/2015 | Fujii et al. | |
| 2015/0318988 | A1* | 11/2015 | Kawai | H04L 9/3073 380/44 |

FOREIGN PATENT DOCUMENTS

| | | |
|---|---|---|
| JP | 2011-124853 A | 6/2011 |
| JP | 2012-150287 A | 8/2012 |
| JP | 5135070 B2 | 1/2013 |
| JP | 5144991 B2 | 2/2013 |
| JP | 5325755 B2 | 10/2013 |
| JP | 5469618 B2 | 4/2014 |
| JP | 2015-18057 A | 1/2015 |
| JP | 5905128 B2 | 4/2016 |
| JP | 2016-76759 A | 5/2016 |
| WO | WO 2014/024956 A1 | 2/2014 |
| WO | WO 2014/112048 A1 | 7/2014 |
| WO | WO-2015107620 A1 * | 7/2015 ......... H04L 63/0464 |

OTHER PUBLICATIONS

Liang et al. "Attribute Based Proxy Re-encryption with Delegating Capabilities" [online] Shanghai Jiao Tong University, Mar. 10, 2009 [retrieved Oct. 7, 2021]. Retrieved from the Internet: URL: https://dl.acm.org/doi/pdf/10.1145/1533057.1533094 (Year: 2009).*
International Search Report (PCT/ISA/210) issued in PCT/JP2017/021477, dated Sep. 5, 2017.
Kawai et al., "Fully-Anonymous Functional Proxy-Re-Encryption," Cryptology ePrint Archive, Oct. 11, 2013, pp. 1-72.

* cited by examiner

RE-ENCRYPTION KEY GENERATION DEVICE, RE-ENCRYPTION DEVICE, RE-ENCRYPTED CIPHERTEXT DECRYPTION DEVICE, AND CRYPTOGRAPHIC SYSTEM

TECHNICAL FIELD

The present invention relates to proxy-re-encryption.

BACKGROUND ART

An attribute-based proxy-re-encryption scheme is a scheme in which decryption authority for a ciphertext can be changed without decrypting the ciphertext. In an attribute-based encryption scheme, a key attribute x is set in a decryption key, and a ciphertext attribute y is set in a ciphertext. In the attribute-based encryption scheme, the ciphertext can be decrypted only when the key attribute x and the ciphertext attribute y satisfy a relation $R(x, y)=1$. In the attribute-based proxy-re-encryption scheme, by using a re-encryption key, a ciphertext attribute y that is set in a ciphertext can be changed to a different ciphertext attribute y' without decrypting the ciphertext.

Patent Literature 1 and Non-Patent Literature 1 provide descriptions related to attribute-based proxy-re-encryption schemes.

CITATION LIST

Patent Literature

Patent Literature 1: WO 2014/112048 A1

Non-Patent Literature

Non-Patent Literature 1: Yutaka Kawai and Katsuyuki Takashima, Fully-Anonymous Functional Proxy-Re-Encryption. Cryptology ePrint Archive: Report 2013/318

SUMMARY OF INVENTION

Technical Problem

In the attribute-based proxy-re-encryption schemes described in Patent Literature 1 and Non-Patent Literature 1, a random matrix is included in a re-encrypted ciphertext, so that the size of the re-encrypted ciphertext increases.

It is an object of the present invention to make it possible to realize an attribute-based proxy-re-encryption scheme in which an increase in the size of a ciphertext entailed in re-encryption is reduced.

Solution to Problem

A re-encryption key generation device according to the present invention includes:
  a randomization unit to set a random number in a decryption key $tdk_x$ in which a key attribute x is set and set a random number in a tag $tg_\varphi$ used to decrypt a ciphertext with the decryption key $tdk_x$, so as to generate a decryption key $tdk_x^\wedge$ and a tag $tg_\varphi^\wedge$;
  an encryption key generation unit to encrypt the decryption key $tdk_x^\wedge$ generated by the randomization unit by an attribute-based encryption scheme using a ciphertext attribute y', so as to generate an encryption key $act_{y'}$; and
  a re-encryption key output unit to output a re-encryption key $rk_{x,y'}$, including the encryption key $act_{y'}$ generated by the encryption key generation unit and the tag $tg_\varphi^\wedge$ generated by the randomization unit.

Advantageous Effects of Invention

In the present invention, a decryption key of tag-added attribute-based encryption is encrypted using attribute-based encryption to generate a re-encryption key. This eliminates the need to include a random matrix in a re-encrypted ciphertext, so that an increase in the size of a ciphertext entailed in re-encryption can be reduced.

DESCRIPTION OF EMBODIMENTS

First Embodiment

\*\*\*Description of Notations\*\*\*

Figure 1:
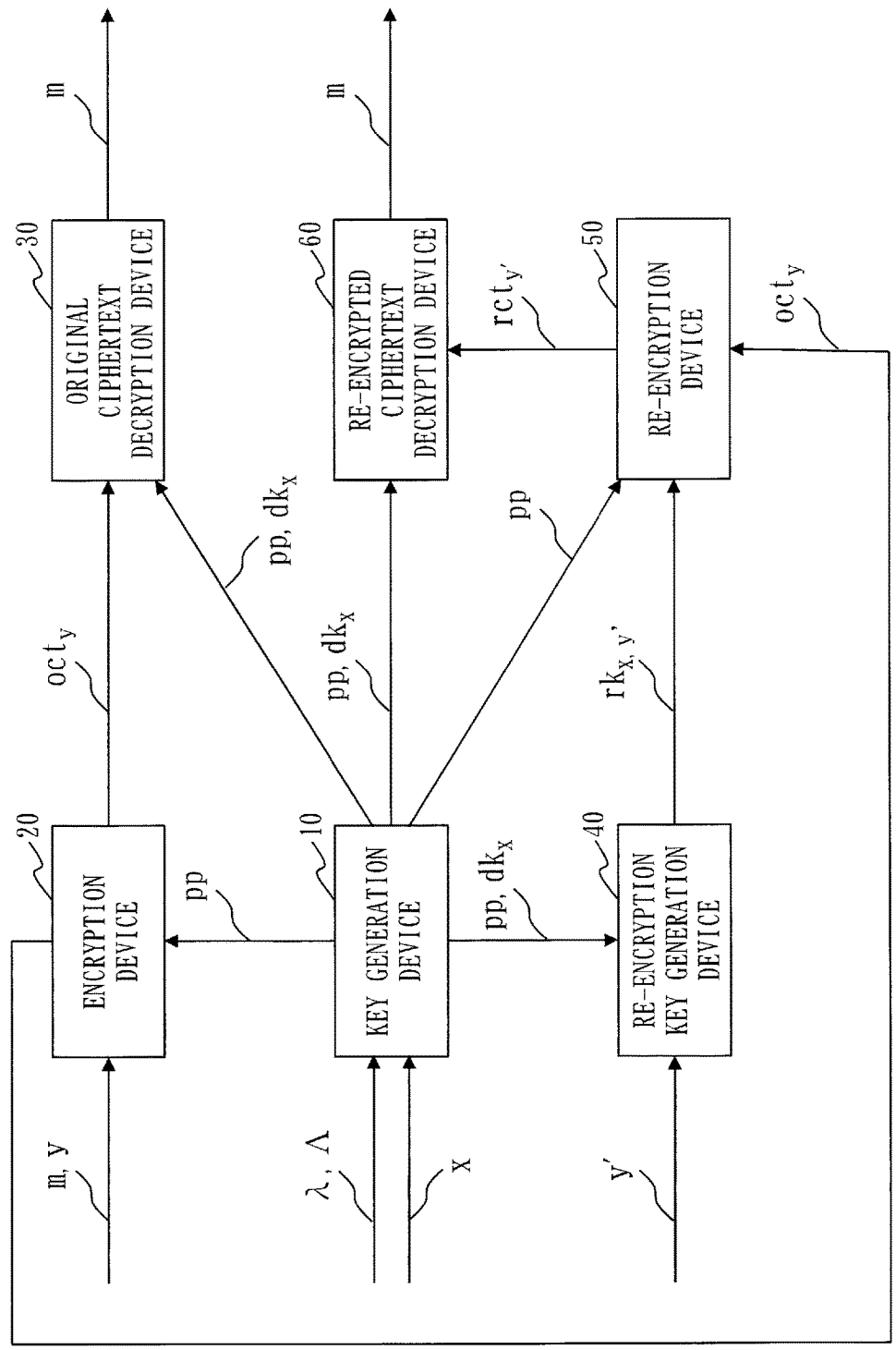
FIG. 1 is a configuration diagram of a cryptographic system 1 according to a first embodiment.

Notations in the following description will be described.

When A is a random variable or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that y is a set defined by z, or y is a set substituted by z.

$$y := z \quad \text{[Formula 103]}$$

When a is a constant, Formula 104 denotes that a machine (algorithm) A outputs a on input x.

$$A(x) \to a \quad \text{[Formula 104]}$$

for example, $$A(x) \to 1$$

Formula 105, that is $F_q$, denotes a finite field of order q.

$$\mathbb{F}_q \quad \text{[Formula 105]}$$

A vector representation denotes a vector representation in the finite field $F_q$. That is, it is as indicated in Formula 106.

$\vec{x}$ denotes $$(x_1, \ldots, x_n) \in \mathbb{F}_q^n \quad \text{[Formula 106]}$$

Formula 107 denotes the inner-product, indicated in Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^n x_i v_i$$

[Formula 109]

Note that $X^T$ denotes the transpose of a matrix X.

For a basis B and a basis B* indicated in Formula 110, Formula 111 is established.

$$\mathbb{B} := (b^1, \ldots, b^N),$$

$$\mathbb{B}^* := (b^{*1}, \ldots, b^{*N}) \quad \text{[Formula 110]}$$

$$(x_1, \ldots, x_N)_\mathbb{B} := \Sigma_{i=1}^N x_i b_i,$$

$$(y_1, \ldots, y_N)_{\mathbb{B}^*} := \Sigma_{i=1}^N y_i b_i^*$$

[Formula 111]

Note that $\vec{e}_j$ denotes a normal basis vector indicated in Formula 112.

$$\vec{e}_j := (\overset{j-1}{\overline{0 \ldots 0}}, 1, \overset{n-j}{\overline{0 \ldots 0}}) \in \mathbb{F}_q^n \text{ for } j = 1, \ldots, n, \quad \text{[Formula 112]}$$

\*\*\*Description of Spaces\*\*\*

Spaces used in the following description will be described.

Symmetric bilinear pairing groups will be described.

Symmetric bilinear pairing groups (q, G, $G_T$, g, e) are a tuple of a prime q, a cyclic additive group G of order q, a cyclic multiplicative group $G_T$ of order q, $g \neq 0 \in G$, and a polynomial-time computable nondegenerate bilinear pairing $e: G \times G \to G_T$. The nondegenerate bilinear pairing signifies $e(sg, tg) = e(g, g)^{st}$, and $e(g, g) \neq 1$.

In the following description, let $G_{bpg}$ be an algorithm that takes as input $1^\lambda$, and outputs values of a parameter $param_G := (q, G, G_T, g, e)$ of bilinear pairing groups with a security parameter $\lambda$.

Dual pairing vector spaces will be described.

Dual pairing vector spaces (q, V, $G_T$, A, e) can be constructed by a direct product of the symmetric bilinear pairing groups ($param_G := (q, G, G_T, g, e)$). The dual pairing vector spaces (q, V, $G_T$, A, e) are a tuple of a prime q, an N-dimensional vector space V over $F_q$ indicated in Formula 113, a cyclic group $G_T$ of order q, and a canonical basis $A := (a_1, \ldots, a_N)$ of the space V, and have the following operations (1) and (2), where $a_i$ is as indicated in Formula 114.

$$\mathbb{V} := \overset{N}{\overline{\mathbb{G} \times \ldots \times \mathbb{G}}} \quad \text{[Formula 113]}$$

$$a_i := (\overset{i-1}{\overline{0, \ldots, 0}}, g, \overset{N-i}{\overline{0, \ldots, 0}}) \quad \text{[Formula 114]}$$

Operation (1): Nondegenerate Bilinear Pairing

A pairing on the space V is defined by Formula 115.

$$e(x, y) := \Pi_{i=1}^N e(G_i, H_i) \in \mathbb{G}_T \quad \text{[Formula 115]}$$

where $$(G_1, \ldots, G_N) := x \in \mathbb{V},$$

$$(H_1, \ldots, H_N) := y \in \mathbb{V}$$

This is nondegenerate bilinear, that is, $e(sx, ty) = e(x, y)^{st}$ and if $e(x, y) = 1$ for all $y \in V$, then $x = 0$. For all i and j, $e(a_i, a_j) = e(g, g)^{\delta_{i,j}}$ where $\delta_{i,j} = 1$ if $i = j$, and $\delta_{i,j} = 0$ if $i \neq j$, and $e(g, g) \neq 1 \in G_T$.

Operation (2): Distortion Maps

Linear transformations $\varphi_{i,j}$ on the space V indicated in Formula 116 can achieve Formula 117.

If $\phi_{i,j}(a_j) = a_i$ and $k \neq j$, then $\phi_{i,j}(a_k) = 0$. [Formula 116]

$$\phi_{i,j}(x) := (\overset{i-1}{\overline{0, \ldots, 0}}, g_j, \overset{N-i}{\overline{0, \ldots, 0}}) \quad \text{[Formula 117]}$$

where $$(g_1, \ldots g_N) := x.$$

The linear transformations $\varphi_{i,j}$ will be called distortion maps.

In the following description, let $G_{dpvs}$ be an algorithm that takes as input $1^\lambda$ and the number of dimensions $N_t$ of the space V, and outputs values of a parameter $param_v:=(q, V, G_T, A, e)$ of dual pairing vector spaces with a security parameter $\lambda$.

\*\*\*Description of Configurations\*\*\*

A configuration of a cryptographic system 1 according to a first embodiment will be described with reference to FIG. 1.

The cryptographic system 1 includes a key generation device 10, an encryption device 20, an original ciphertext decryption device 30, a re-encryption key generation device 40, a re-encryption device 50, and a re-encrypted ciphertext decryption device 60.

The key generation device 10, the encryption device 20, the original ciphertext decryption device 30, the re-encryption key generation device 40, the re-encryption device 50, and the re-encrypted ciphertext decryption device 60 are connected via transmission lines.

Figure 2:
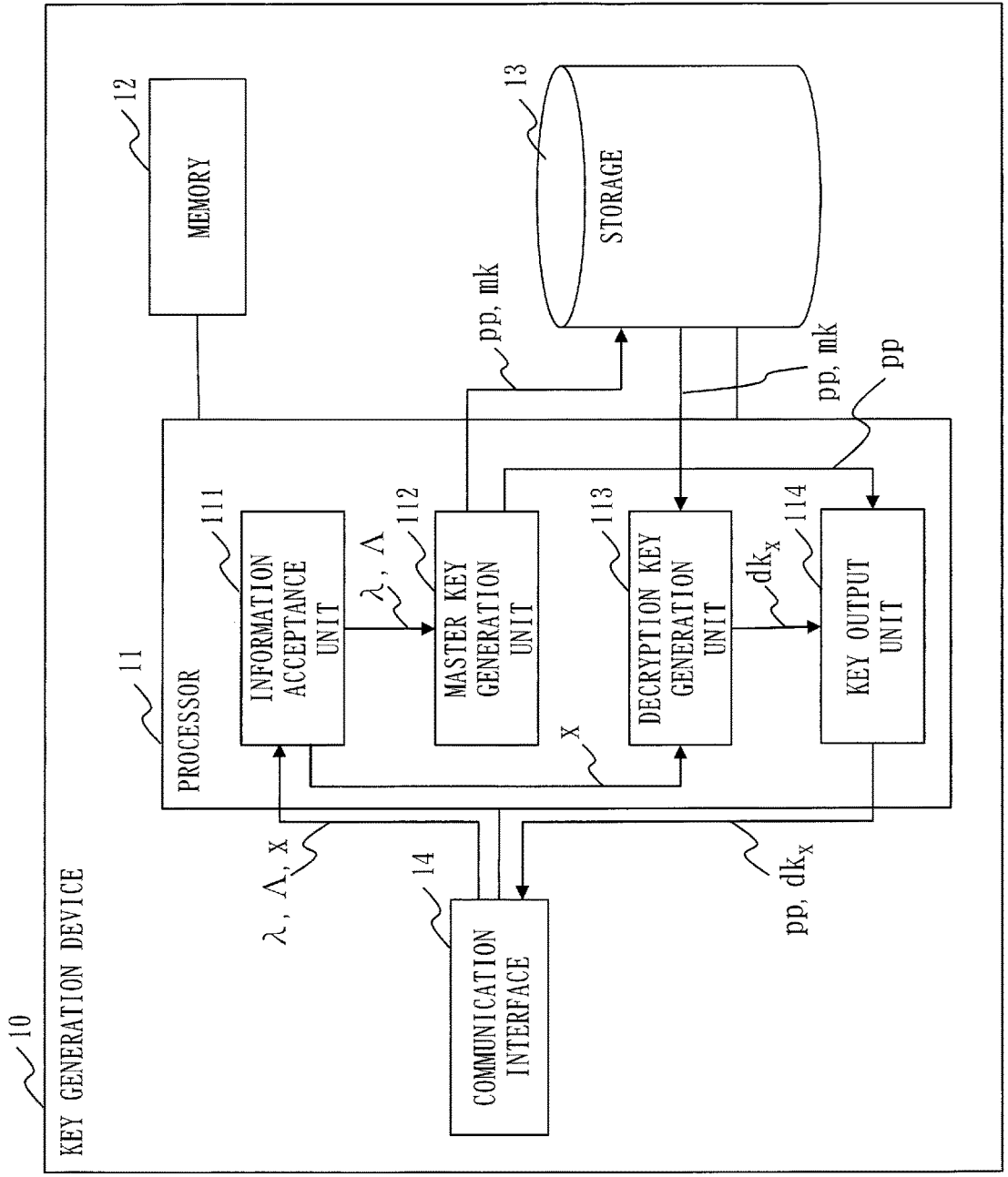
FIG. 2 is a configuration diagram of a key generation device 10 according to the first embodiment.

A configuration of the key generation device 10 according to the first embodiment will be described with reference to FIG. 2.

The key generation device 10 is a computer.

The key generation device 10 includes hardware of a processor 11, a memory 12, a storage 13, and a communication interface 14. The processor 11 is connected with other hardware components via signal lines and controls these other hardware components.

The key generation device 10 includes, as functional components, an information acceptance unit 111, a master key generation unit 112, a decryption key generation unit 113, and a key output unit 114. The functions of the functional components of the key generation device 10 are realized by software.

The storage 13 stores programs for realizing the functions of the functional components of the key generation device 10. These programs are loaded into the memory 12 by the processor 11 and executed by the processor 11. This realizes the functions of the functional components of the key generation device 10.

Figure 3:
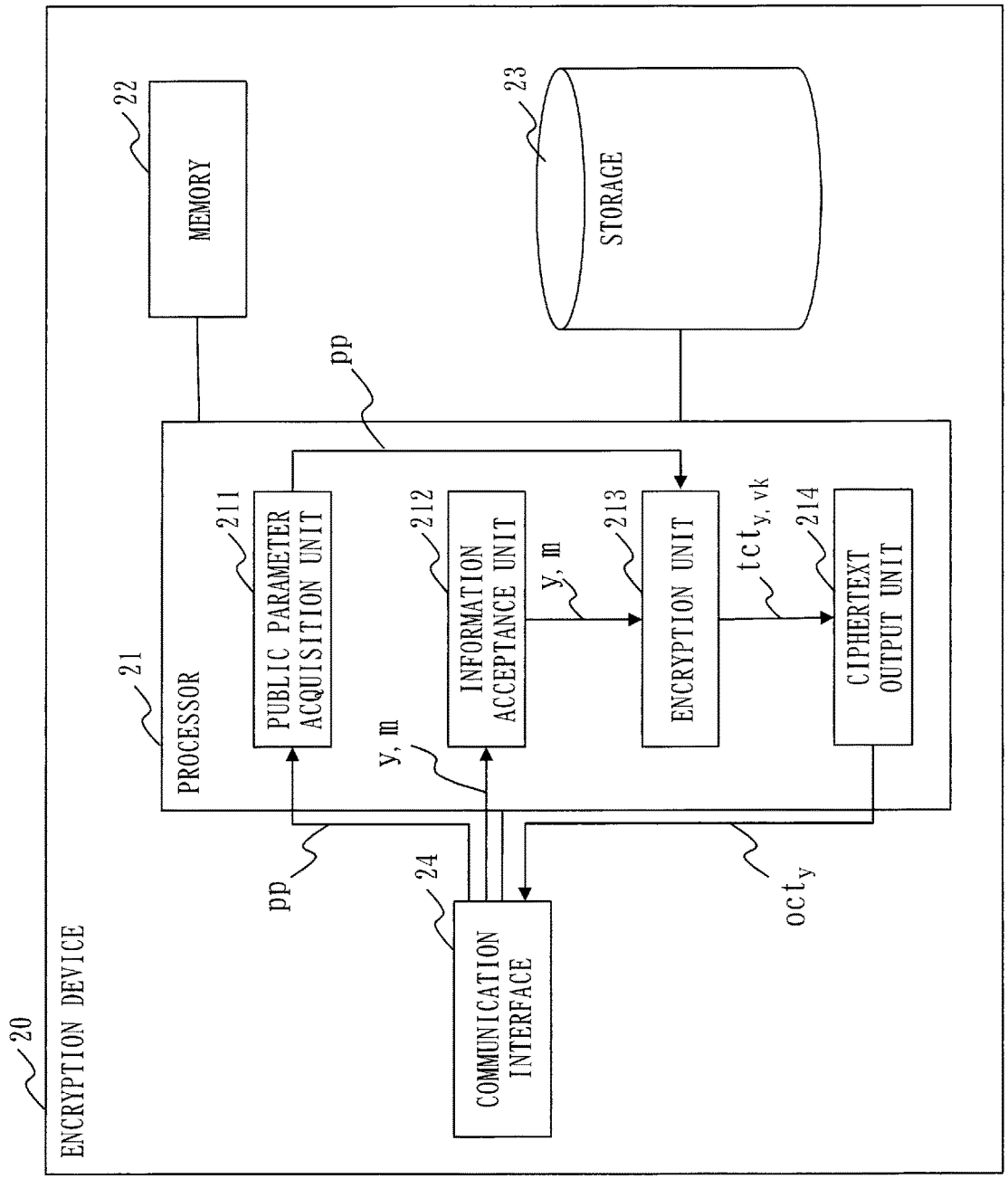
FIG. 3 is a configuration diagram of an encryption device 20 according to the first embodiment.

A configuration of the encryption device 20 according to the first embodiment will be described with reference to FIG. 3.

The encryption device 20 is a computer.

The encryption device 20 includes hardware of a processor 21, a memory 22, a storage 23, and a communication interface 24. The processor 21 is connected with other hardware components via signal lines and controls these other hardware components.

The encryption device 20 includes, as functional components, a public parameter acquisition unit 211, an information acceptance unit 212, an encryption unit 213, and a ciphertext output unit 214. The functions of the functional components of the encryption device 20 are realized by software.

The storage 23 stores programs for realizing the functions of the functional components of the encryption device 20. These programs are loaded into the memory 22 by the processor 21 and executed by the processor 21. This realizes the functions of the functional components of the encryption device 20.

Figure 4:
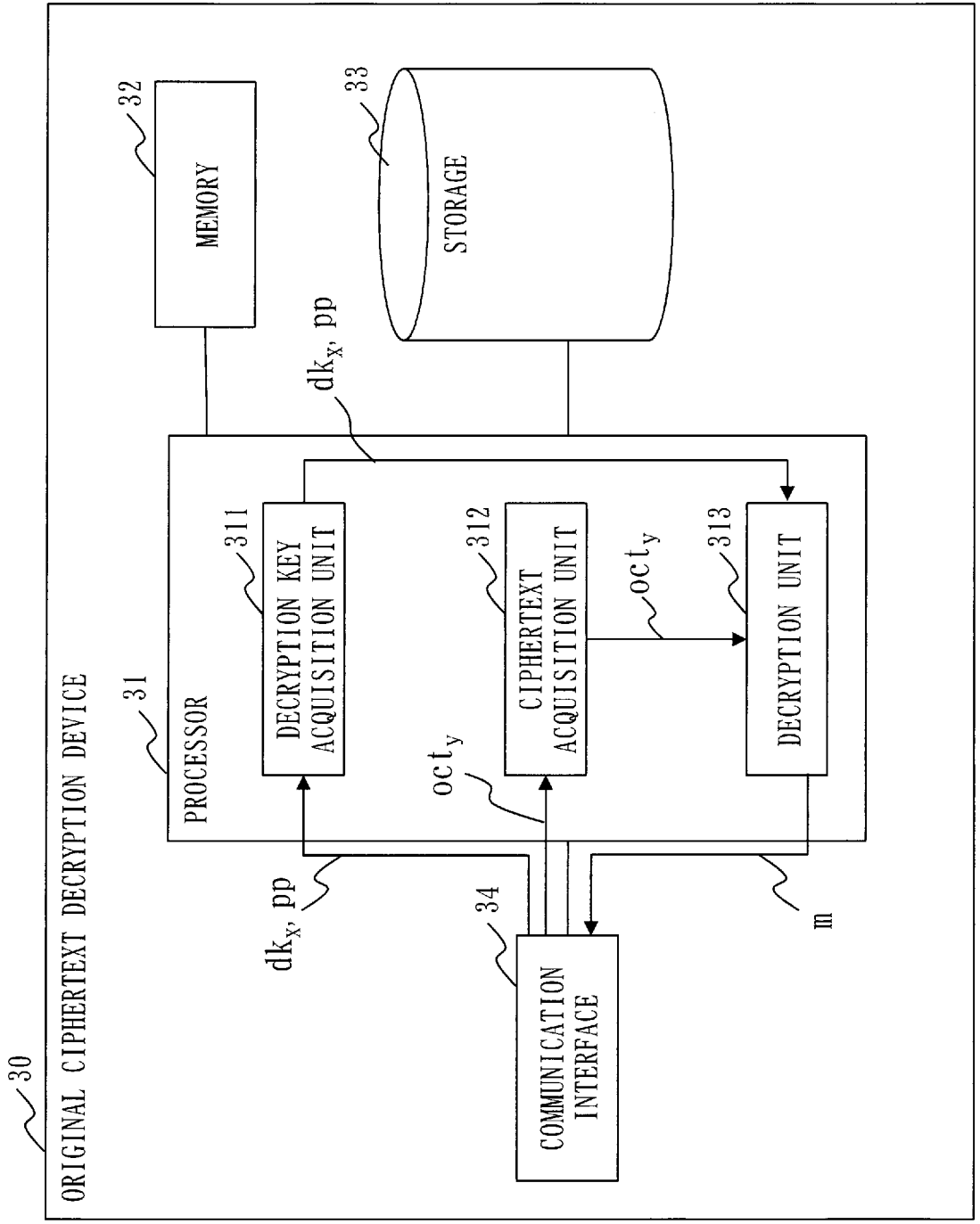
FIG. 4 is a configuration diagram of an original ciphertext decryption device 30 according to the first embodiment.

A configuration of the original ciphertext decryption device 30 according to the first embodiment will be described with reference to FIG. 4.

The original ciphertext decryption device 30 is a computer.

The original ciphertext decryption device 30 includes hardware of a processor 31, a memory 32, a storage 33, and a communication interface 34. The processor 31 is connected with other hardware components via signal lines and controls these other hardware components.

The original ciphertext decryption device 30 includes, as functional components, a decryption key acquisition unit 311, a ciphertext acquisition unit 312, and a decryption unit 313. The functions of the functional components of the original ciphertext decryption device 30 are realized by software.

The storage 33 stores programs for realizing the functions of the functional components of the original ciphertext decryption device 30. These programs are loaded into the memory 32 by the processor 31 and executed by the processor 31. This realizes the functions of the functional components of the original ciphertext decryption device 30.

Figure 5:
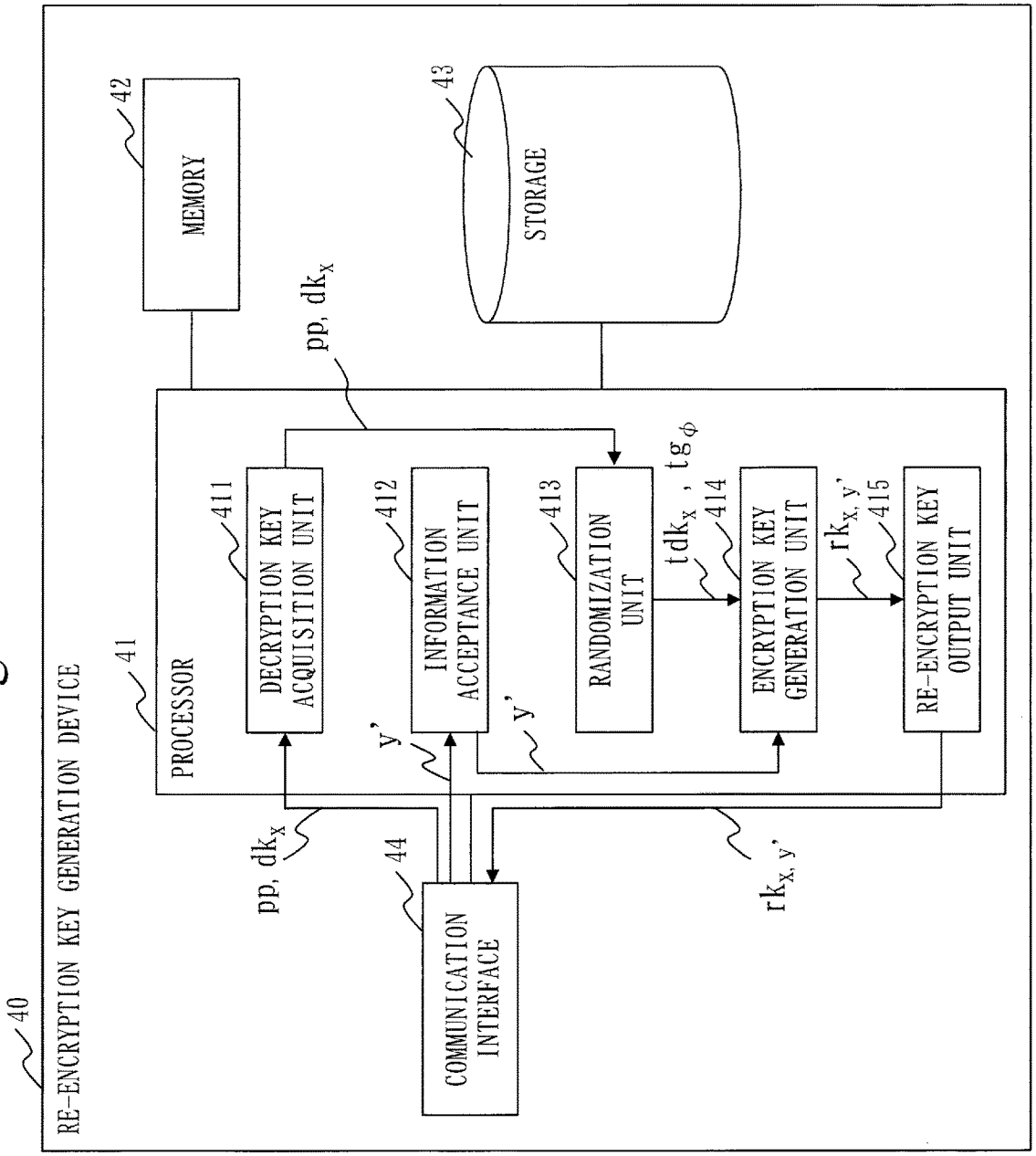
FIG. 5 is a configuration diagram of a re-encryption key generation device 40 according to the first embodiment.

A configuration of the re-encryption key generation device 40 according to the first embodiment will be described with reference to FIG. 5.

The re-encryption key generation device 40 is a computer.

The re-encryption key generation device 40 includes hardware of a processor 41, a memory 42, a storage 43, and a communication interface 44. The processor 41 is connected with other hardware components via signal lines and controls these other hardware components.

The re-encryption key generation device 40 includes, as functional components, a decryption key acquisition unit 411, an information acceptance unit 412, a randomization unit 413, an encryption key generation unit 414, and a re-encryption key output unit 415. The functions of the functional components of the re-encryption key generation device 40 are realized by software.

The storage 43 stores programs for realizing the functions of the functional components of the re-encryption key generation device 40. These programs are loaded into the memory 42 by the processor 41 and executed by the processor 41. This realizes the functions of the functional components of the re-encryption key generation device 40.

Figure 6:
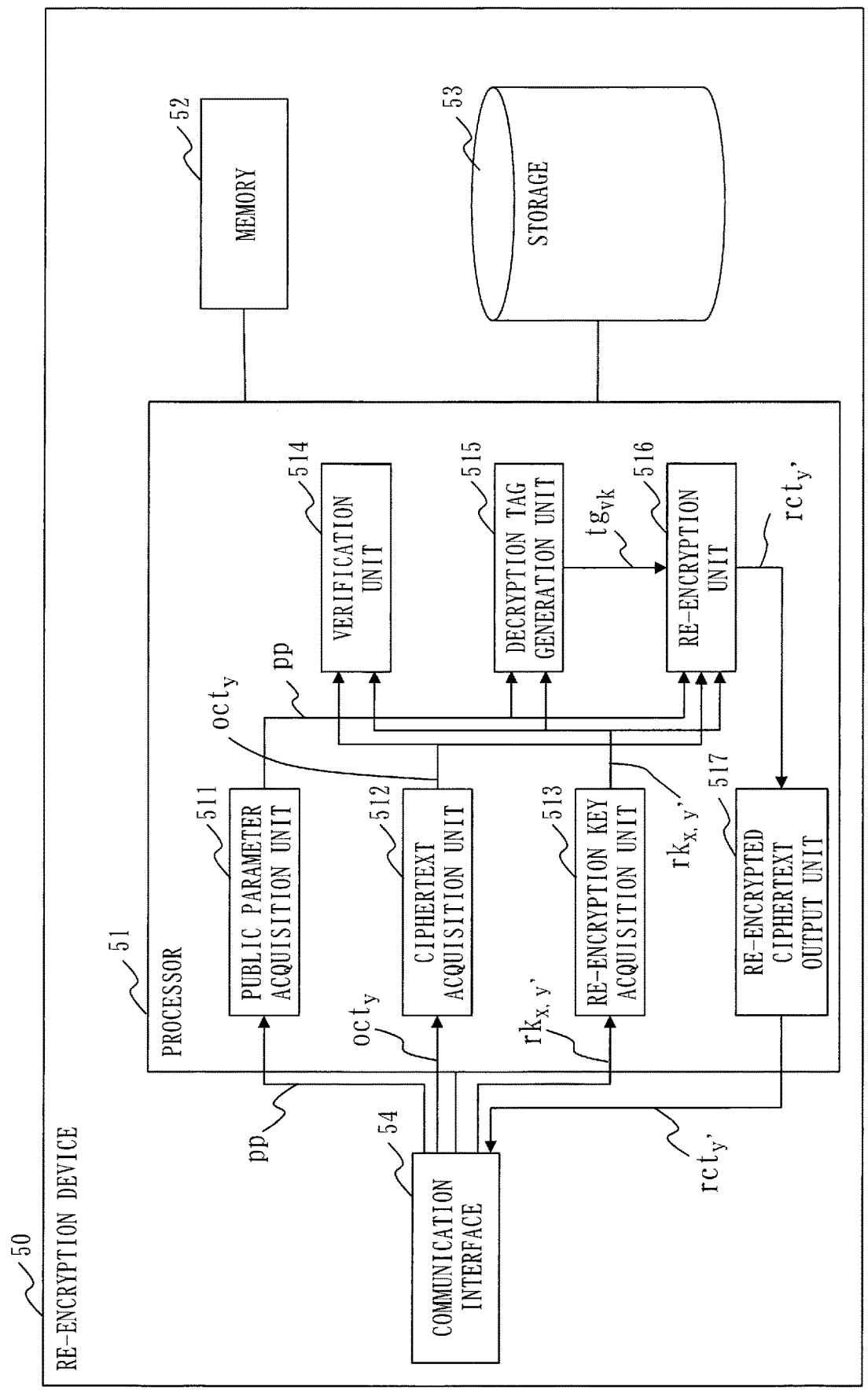
FIG. 6 is a configuration diagram of a re-encryption device 50 according to the first embodiment.

A configuration of the re-encryption device 50 according to the first embodiment will be described with reference to FIG. 6.

The re-encryption device 50 is a computer.

The re-encryption device 50 includes hardware of a processor 51, a memory 52, a storage 53, and a communication interface 54. The processor 51 is connected with other hardware components via signal lines and controls these other hardware components.

The re-encryption device 50 includes, as functional components, a public parameter acquisition unit 511, a ciphertext acquisition unit 512, a re-encryption key acquisition unit 513, a verification unit 514, a decryption tag generation unit 515, a re-encryption unit 516, and a re-encrypted ciphertext output unit 517. The functions of the functional components of the re-encryption device 50 are realized by software.

The storage 53 stores programs for realizing the functions of the functional components of the re-encryption device 50. These programs are loaded into the memory 52 by the processor 51 and executed by the processor 51. This realizes the functions of the functional components of the re-encryption device 50.

Figure 7:
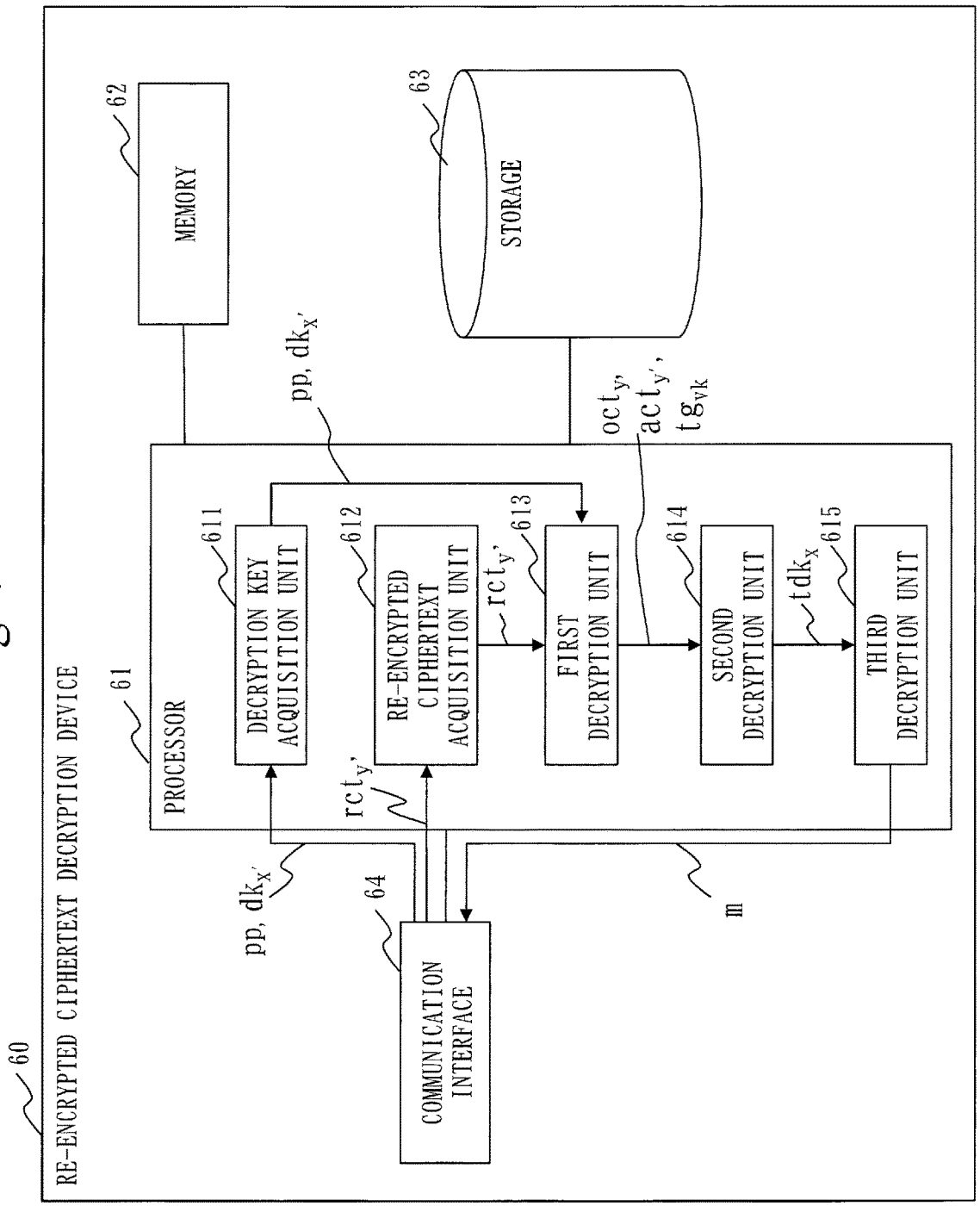
FIG. 7 is a configuration diagram of a re-encrypted ciphertext decryption device 60 according to the first embodiment.

A configuration of the re-encrypted ciphertext decryption device 60 according to the first embodiment will be described with reference to FIG. 7.

The re-encrypted ciphertext decryption device 60 is a computer.

The re-encrypted ciphertext decryption device 60 includes hardware of a processor 61, a memory 62, a storage 63, and a communication interface 64. The processor 61 is connected with other hardware components via signal lines and controls these other hardware components.

The re-encrypted ciphertext decryption device 60 includes, as functional components, a decryption key acquisition unit 611, a re-encrypted ciphertext acquisition unit 612, a first decryption unit 613, a second decryption unit 614, and a third decryption unit 615. The functions of the functional components of the re-encrypted ciphertext decryption device 60 are realized by software.

The storage 63 stores programs for realizing the functions of the functional components of the re-encrypted ciphertext decryption device 60. These programs are loaded into the memory 62 by the processor 61 and executed by the processor 61. This realizes the functions of the functional components of the re-encrypted ciphertext decryption device 60.

It has been described above that each of the encryption device 20, the original ciphertext decryption device 30, the re-encryption key generation device 40, the re-encryption device 50, and the re-encrypted ciphertext decryption device 60 is a separate device.

However, the cryptographic system 1 may include a device that has the functions of two or more of the encryption device 20, the original ciphertext decryption device 30, the re-encryption key generation device 40, the re-encryption device 50, and the re-encrypted ciphertext decryption device 60. For example, the cryptographic system 1 may include a plurality of devices, each having the functions of the encryption device 20, the original ciphertext decryption device 30, the re-encryption key generation device 40, and the re-encrypted ciphertext decryption device 60.

* Description of Operation *

Operation of the cryptographic system 1 according to the first embodiment will be described with reference to FIGS. 8 to 14.

The operation of the cryptographic system 1 according to the first embodiment corresponds to a cryptographic method according to the first embodiment. The operation of the cryptographic system 1 according to the first embodiment also corresponds to processes of a cryptographic program.

The cryptographic system 1 according to the first embodiment realizes an attribute-based proxy-re-encryption scheme. The attribute-based proxy-re-encryption scheme realized by the cryptographic system 1 according to the first embodiment includes seven algorithms: Setup, KG, Enc, ODec, RKG, REnc, and RDec.

Figure 8:
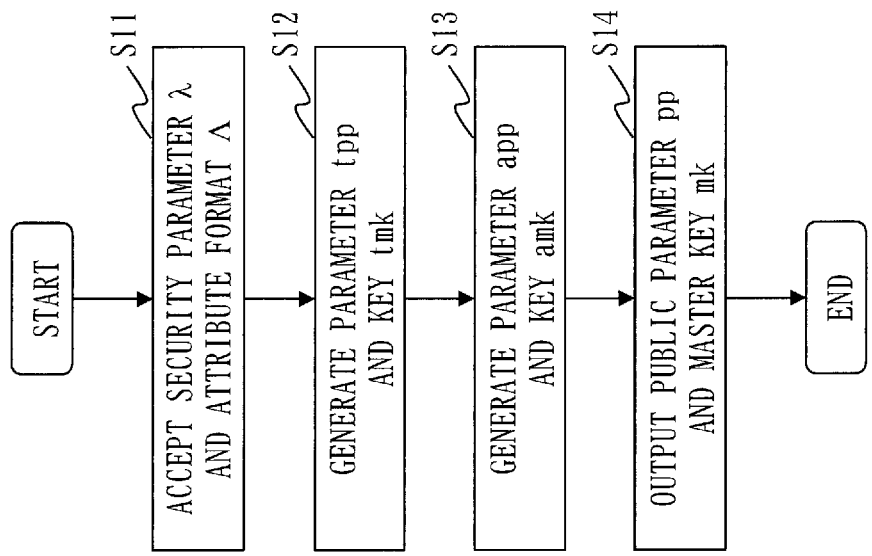
FIG. 8 is a flowchart of a Setup algorithm according to the first embodiment.

The Setup algorithm according to the first embodiment will be described with reference to FIG. 8.

The Setup algorithm is executed by the key generation device 10. The Setup algorithm is a probabilistic algorithm that takes as input a security parameter $\lambda$ and an attribute format $\Lambda$, and outputs a public parameter pp and a master key mk.

(Step S11: Information Acceptance Process)

The information acceptance unit 111 accepts input of a security parameter $\lambda$ and an attribute format $\Lambda$. Specifically, the information acceptance unit 111 accepts the security parameter $\lambda$ and the attribute format A that are input through operation of an input device by an administrator of the key generation device 10.

(Step S12: Tag-Added Master Key Generation Process)

The master key generation unit 112 executes a TSetup algorithm indicated in Formula 118, taking as input the security parameter $\lambda$ and the attribute format A that are accepted in step S11, so as to generate a parameter tpp and a key tmk.

[Formula 118]

$$TSetup(1^\lambda, \Lambda):$$

$$(param, (\mathbb{B}_0, \mathbb{B}_0^*), (\mathbb{B}_1, \mathbb{B}_1^*), (\mathbb{B}_2, \mathbb{B}_2^*))$$

$$\xleftarrow{R} G_{ob}(1^\lambda, N_0 = 5, N_1 = 4n, N_2 = 8),$$

$$\hat{\mathbb{B}}_0 = (b_{0,1}, b_{0,2}, b_{0,5}),$$

$$\hat{\mathbb{B}}_1 = (b_{1,1}, \ldots, b_{1,n}, b_{1,3n+1}, \ldots, b_{1,4n}),$$

$$\hat{\mathbb{B}}_2 = (b_{2,1}, b_{2,2}, b_{2,7}, b_{2,8}),$$

$$\hat{\mathbb{B}}_0^* = (b_{0,2}^*, b_{0,4}^*),$$

$$\hat{\mathbb{B}}_1^* = (b_{1,1}^*, \ldots, b_{1,n}^*, b_{1,2n+1}^*, \ldots, b_{1,3n}^*),$$

$$\hat{\mathbb{B}}_2^* = (b_{2,1}^*, b_{2,2}^*, b_{2,5}^*, b_{2,6}^*),$$

$$\text{return } tpp = \left(param, \{\hat{\mathbb{B}}_i, \hat{\mathbb{B}}_i^*\}_{i=0,1,2}\right), tmk = b_{0,1}^*.$$

Note that an algorithm $G_{ob}$ is as indicated in Formula 119.

[Formula 119]

$$G_{ob}(1^\lambda, \vec{N}):$$

$$param_{\mathbb{G}} = (q, \mathbb{G}, \mathbb{G}_T, g, e) \xleftarrow{R} G_{bpg}(1^\lambda),$$

$$\psi \xleftarrow{} \mathbb{F}_q^\times,$$

$$g_T = e(g, g)^\psi,$$

$$\text{for } t \in \vec{N}:$$

$$param_{V_t} = (q, \mathbb{V}, \mathbb{G}_t, \mathbb{A}_t, e) \xleftarrow{R} G_{dpvs}(1^\lambda, N_t),$$

$$X_t = \begin{pmatrix} \vec{x}_{t,1} \\ \vdots \\ \vec{x}_{t,N_t} \end{pmatrix} := (x_{t,i,j})_{i,j} \xleftarrow{U} GL(N_t, \mathbb{F}_q),$$

$$\begin{pmatrix} \vec{v}_{t,1} \\ \vdots \\ \vec{v}_{t,N_t} \end{pmatrix} := (v_{t,i,j})_{i,j} := \psi \cdot (X_j^T)^{-1},$$

$$b_{t,i} := \sum_{j=1}^{N_t} x_{t,i,j} a_{t,j}, \mathbb{B}_t := (b_{t,1}, \ldots, b_{t,N_t}),$$

$$b_{t,i}^* := \sum_{j=1}^{N_t} v_{t,i,j} a_{t,j}, \mathbb{B}_t^* := (b_{t,1}^*, \ldots, b_{t,N_t}^*),$$

$$param := \left(g_T, \{param_{V_t}\}_{t \in \vec{N}}\right),$$

$$\text{return}\left(param, \{\mathbb{B}_t, \mathbb{B}_t^*\}_{t \in \vec{N}}\right).$$

(Step S13: Tagless Master Key Generation Process)

The master key generation unit 112 executes an ASetup algorithm indicated in Formula 120, taking as input the security parameter $\lambda$, and the attribute format $\Lambda$ that are accepted in step S11, so as to generate a parameter app and a key amk.

$ASetup(1^\lambda, \Lambda):$ [Formula 120]

$(param, \mathbb{B}_3, \hat{\mathbb{B}}_3^*) \xleftarrow{R} G_{ob}(1^\lambda, N_3 = 3n + 2),$ $\hat{\mathbb{B}}_3 = (b_{3,1}, \ldots, b_{3,n+1}, b_{3,3n+2}),$ $\hat{\mathbb{B}}_3^* = (b_{3,2}^*, \ldots, b_{3,n+1}^*, b_{3,2n+2}^*, \ldots, b_{3,3n+1}^*),$ return $app = (param, \hat{\mathbb{B}}_3, \hat{\mathbb{B}}_3^*), amk = b_{3,1}^*.$ (Step S14: Master Key Output Process)

The key output unit 114 makes public, as a public parameter pp, the security parameter λ input in step S11, the parameter tpp generated in step S12, and the parameter app generated in step S13 by, for example, transmitting them to other devices via the communication interface 14. The key output unit 114 writes the public parameter pp in the storage 13. The key output unit 114 writes, as a master key mk, the key tmk generated in step S12 and the key amk generated in step S13 in the storage 13.

Figure 9:
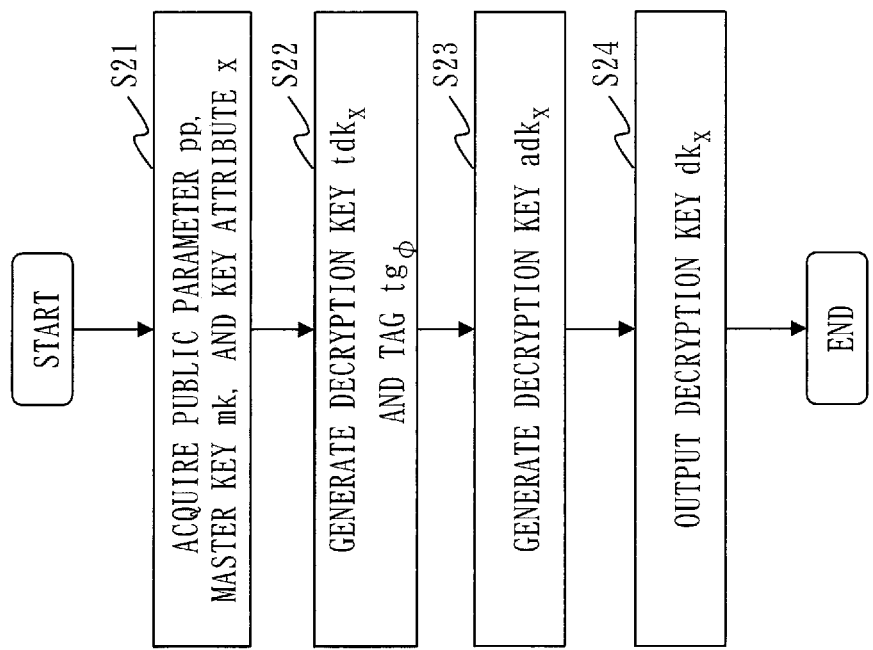
FIG. 9 is a flowchart of a KG algorithm according to the first embodiment.

The KG algorithm according to the first embodiment will be described with reference to FIG. 9.

The KG algorithm is executed by the key generation device 10. The KG algorithm is a probabilistic algorithm that takes as input the public parameter pp, the master key mk, and a key attribute x, and outputs a decryption key $dk_x$.

(Step S21: Information Acceptance Process)

The information acceptance unit 111 reads the public parameter pp and the master key mk from the storage 13.

The information acceptance unit 111 accepts input of a key attribute x. Specifically, the information acceptance unit 111 accepts the key attribute x that is input through operation of the input device by the administrator of the key generation device 10.

The key attribute x is an attribute of a user who uses a decryption key $dk_x$ to be described later. As a specific example, the key attribute x is information such as a department to which the user who uses the decryption key $dk_x$ belongs and a position in a company or the like of the user. The key attribute x is assumed here to be an attribute of a user of the original ciphertext decryption device 30. The key attribute x is assumed to be an n-dimensional vector.

(Step S22: Tag-Added Decryption Key Generation Process)

The decryption key generation unit 113 executes a TKG algorithm indicated in Formula 121, taking as input the parameter tpp, the key tmk, and the key attribute x, so as to generate a tag-added decryption key including a decryption key $tdk_x$ and a tag $tg_\varphi$. The tag $tg_\varphi$ is information used to decrypt a ciphertext with the decryption key $tdk_x$.

$TKG(tpp, tmk, x):$ [Formula 121]

$s_1, s_2, \delta_1, \eta_0 \xleftarrow{U} \mathbb{F}_q,$ $\vec{\eta}_1 \xleftarrow{U} \mathbb{F}_q^n, \vec{\eta}_2 \xleftarrow{U} \mathbb{F}_q^2,$ $s_0 = s_1 + s_2,$ $k_0^* = (1, -s_0, 0, \eta_0, 0)_{\mathbb{B}_0^*},$ $k_1^* = (s_1\vec{e}_1 + \delta_1 x, 0^n, \vec{\eta}_1, 0^n)_{\mathbb{B}_1^*},$ $k_2^* = (s_2, 0^3, \vec{\eta}_2, 0^2)_{\mathbb{B}_2^*},$ return $tdk_x = (x, k_0^*, k_1^*), tg_\varphi = k_2^*.$ (Step S23: Tagless Decryption Key Generation Process)

The decryption key generation unit 113 executes an AKG algorithm indicated in Formula 122, taking as input the parameter app, the key amk, and the key attribute x, so as to generate a decryption key $adk_x$.

$AKG(app, amk, x):$ [Formula 122]

$s_3 \xleftarrow{U} \mathbb{F}_q, \vec{\eta}_3 \xleftarrow{U} \mathbb{F}_q^n,$ $k_3^* = (1, -s_3 x, 0^n, \vec{\eta}_3, 0)_{\mathbb{B}_3^*},$ return $adk_x = (x, k_3^*).$ (Step S24: Decryption Key Output Process)

The key output unit 114 outputs, as the decryption key $dk_x$, the key attribute x, the tag-added decryption key including the decryption key $tdk_x$ and the tag $tg_\varphi$ generated in step S22, and the decryption key $adk_x$ generated in step S23 to the original ciphertext decryption device 30 and the re-encryption key generation device 40 in secrecy via the communication interface 14.

To output in secrecy means to transmit after encryption by an existing encryption scheme so as to be concealed from others.

The key generation device 10 generates a decryption key $dk_{x'}$ based on a key attribute x' which is an attribute of a user of the re-encrypted ciphertext decryption device 60. The key attribute x' is assumed here to be an n-dimensional vector.

Specifically, in step S21, the information acceptance unit 111 accepts input of the key attribute x'. In step S22, the decryption key generation unit 113 generates a tag-added decryption key including a decryption key $tdk_{x'}$ and a tag $tg_{\varphi'}$, taking as input the parameter tpp, the key tmk, and the key attribute x'. In step S23, the decryption key generation unit 113 generates a decryption key $adk_{x'}$, taking as input the parameter app, the key amk, and the key attribute x'. In step S24, the decryption key generation unit 113 outputs, as the decryption key $dk_{x'}$, the key attribute x', the tag-added decryption key including the decryption key $tdk_{x'}$ and the tag $tg_{\varphi'}$, and the decryption key $adk_{x'}$ to the re-encrypted ciphertext decryption device 60 in secrecy.

Figure 10:
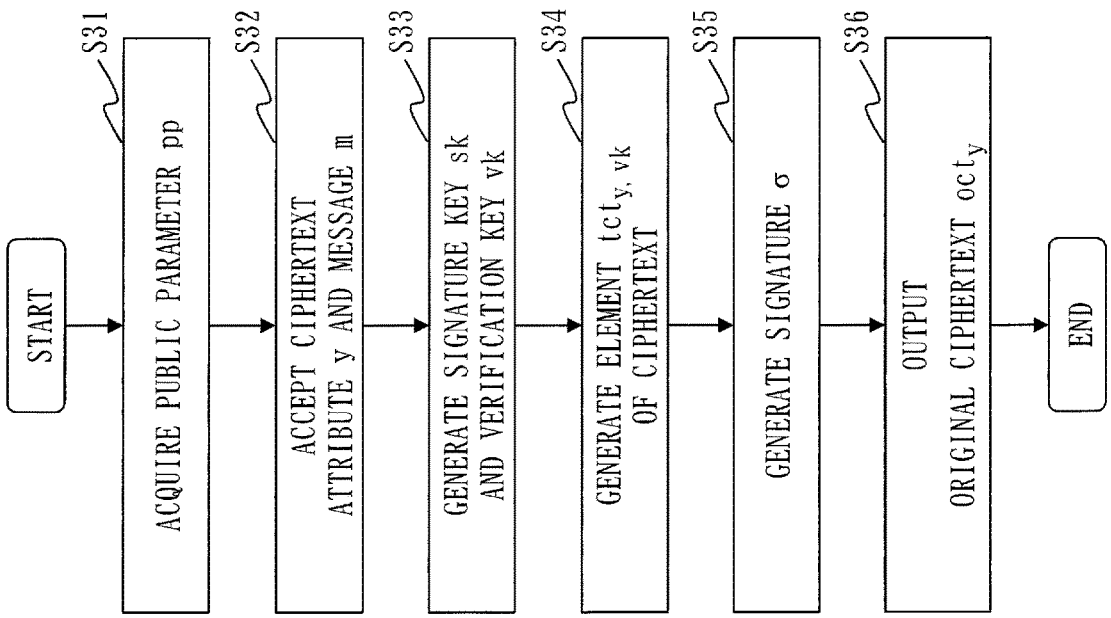
FIG. 10 is a flowchart of an Enc algorithm according to the first embodiment.

The Enc algorithm according to the first embodiment will be described with reference to FIG. 10.

The Enc algorithm is executed by the encryption device 20. The Enc algorithm is a probabilistic algorithm that takes as input the public parameter pp, a ciphertext attribute y, and a message m, and outputs an original ciphertext $oct_y$.

(Step S31: Public Parameter Acquisition Process)

The public parameter acquisition unit 211 acquires, via the communication interface 24, the public parameter pp that is made public by the key generation device 10.

(Step S32: Information Acceptance Process)

The information acceptance unit 212 accepts input of a ciphertext attribute y and a message m. Specifically, the information acceptance unit 212 accepts the ciphertext attribute y and the message m that are input through operation of an input device by a user of the encryption device 20.

The ciphertext attribute y indicates an attribute that is allowed to decrypt the original ciphertext $oct_y$. The ciphertext attribute y is assumed here to correspond to the key attribute x. That is, it is assumed that the original ciphertext $oct_y$ generated based on the ciphertext attribute y can be decrypted with the decryption key $dk_x$ in which the key attribute x is set. The ciphertext attribute y is assumed here to be an n-dimensional vector.

The message m is data to be transmitted to a destination.

(Step S33: Signature Key Generation Process)

The encryption unit 213 executes a key generation algorithm for one-time signatures, taking as input the security parameter λ, so as to generate a signature key sk and a verification key vk for a one-time signature. As the key generation algorithm for one-time signatures, an existing algorithm may be employed.

(Step S34: Ciphertext Element Generation Process)

The encryption unit 213 executes a TEnc algorithm indicated in Formula 123, taking as input the parameter tpp, the ciphertext attribute y, the verification key vk, and the message m, so as to generate an element $tct_{y,vk}$.

$TEnc(tpp, y, vk, m)$: [Formula 123]

$\omega, \zeta, \varphi_0 \xleftarrow{U} \mathbb{F}_q, \vec{\varphi}_1 \xleftarrow{U} \mathbb{F}_q^n, \vec{\varphi}_2 \xleftarrow{U} \mathbb{F}_q^2,$ $c_0 = (\zeta, \omega, 0, 0, \varphi_0)_{B_0},$ $c_1 = (\omega y, 0^{2n}, \vec{\varphi}_1)_{B_1},$ $c_2 = (\omega(1, vk), 0^4, \vec{\varphi}_2)_{B_2},$ $c_T = m \cdot g_T^\zeta,$ return $tct_{y,vk} = (y, c_0, c_1, c_2, c_T).$ That is, the encryption unit 213 encrypts the message m by tag-added attribute-based encryption, so as to generate the element $tct_{y,vk}$. At this time, the encryption unit 213 sets the verification key vk in a portion of the element $tct_{y,vk}$.

(Step S35: Signature Generation Process)

The encryption unit 213 executes a signature algorithm for one-time signatures, taking as input the signature key sk, the ciphertext attribute y, and the element $tct_{y,vk}$, so as to generate a signature σ. As the signature algorithm for one-time signatures, an existing algorithm may be employed.

(Step S36: Ciphertext Output Process)

The ciphertext output unit 214 outputs, as an original ciphertext $oct_y$, the ciphertext attribute y, the verification key vk generated in step S33, the element $tct_{y,vk}$ generated in step S34, and the signature σ generated in step S35 to the original ciphertext decryption device 30.

Figure 11:
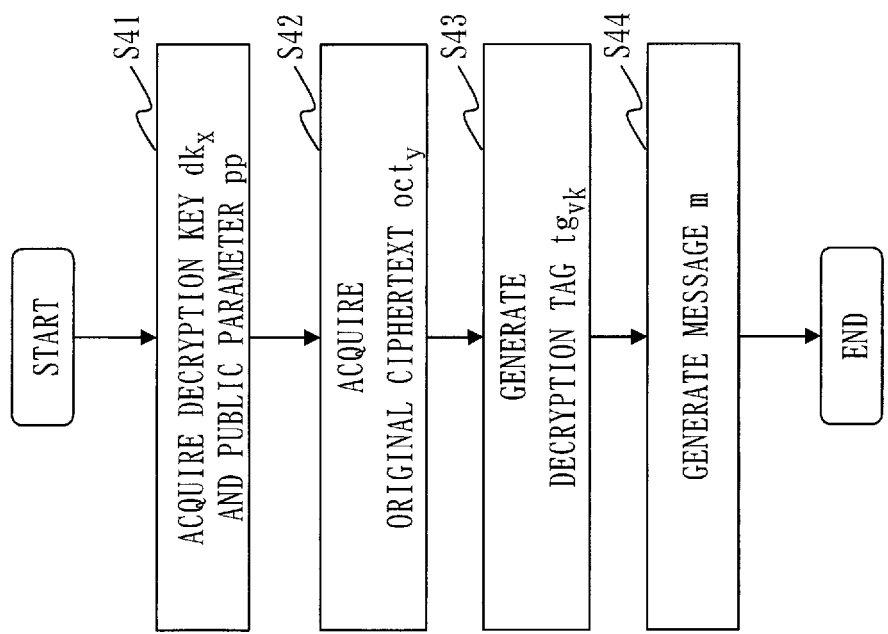
FIG. 11 is a flowchart of an ODec algorithm according to the first embodiment.

The ODec algorithm according to the first embodiment will be described with reference to FIG. 11.

The ODec algorithm is executed by the original ciphertext decryption device 30. The ODec algorithm is an algorithm that takes as input the public parameter pp, the decryption key $dk_x$, and the original ciphertext $oct_y$, and outputs the message m.

(Step S41: Decryption Key Acquisition Process)

The decryption key acquisition unit 311 acquires, via the communication interface 34, the decryption key $dk_x$ and the public parameter pp that are generated by the key generation device 10.

(Step S42: Ciphertext Acquisition Process)

The ciphertext acquisition unit 312 acquires, via the communication interface 34, the original ciphertext $oct_y$ generated by the encryption device 20.

(Step S43: Decryption Tag Generation Process)

The decryption unit 313 transforms the tag $tg_\phi$ included in the decryption key $dk_x$ to generate a decryption tag $tg_{vk}$.

Specifically, the decryption unit 313 executes a TTag algorithm indicated in Formula 124, taking as input the parameter tpp, the tag $tg_\phi$ included in the decryption key $dk_x$, and the verification key vk included in the original ciphertext $oct_y$, so as to generate the decryption tag $tg_{vk}$.

$TTag(tpp, tg_\phi, vk)$: [Formula 124]

parse $tg_\phi = k_2^* = (s_2, 0^3, \vec{\eta}_2, 0^2)_{B_2^*},$ $\delta_2 \xleftarrow{U} \mathbb{F}_q,$ $tg_{vk} = k_2^{*vk} = tg_\phi + (\delta_2(vk, -1), 0^6)_{B_2^*},$ return $tg_{vk}.$ (Step S44: Decryption Process)

The decryption unit 313 decrypts the original ciphertext $oct_y$ to obtain the message m.

Specifically, the decryption unit 313 executes a TDec algorithm indicated in Formula 125, taking as input the parameter tpp, the decryption key $tdk_x$ included in the decryption key $dk_x$, the tag $tg_{vk}$, and the element $tct_{y,vk}$ included in the original ciphertext $oct_y$, so as to generate the message m.

$TDec(tpp, tdk_x, tg_{vk}, tct_{y,vk})$:

parse $tdk_x = (x, k^*_0, k^*_1), tg_{vk} = k^{*vk}_2,$ $tct_{y,vk} = (y, c_0, c_1, c_2, c_T),$ $K = e(c_0, k^*_0) \cdot e(c_1, k^*_1) \cdot e(c_2, k^{*vk}_2),$ return $m = c_T / K.$ [Formula 125]

Figure 12:
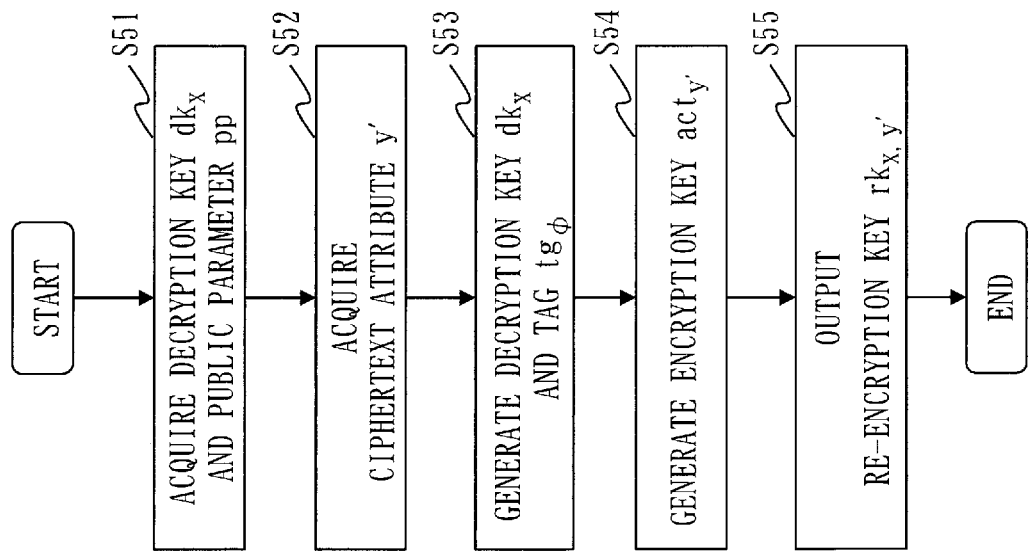
FIG. 12 is a flowchart of an RKG algorithm according to the first embodiment.

The RKG algorithm according to the first embodiment will be described with reference to FIG. 12.

The RKG algorithm is executed by the re-encryption key generation device 40. The RKG algorithm is a probabilistic algorithm that takes as input the public parameter pp, the decryption key $dk_x$, and the ciphertext attribute y', and outputs a re-encryption key $rk_{x,y'}$.

(Step S51: Decryption Key Acquisition Process)

The decryption key acquisition unit 411 acquires, via the communication interface 44, the decryption key $dk_x$ and the public parameter pp that are generated by the key generation device 10.

(Step S52: Information Acceptance Process)

The information acceptance unit 412 accepts input of a ciphertext attribute y'. Specifically, the information acceptance unit 412 accepts the ciphertext attribute y' that is input through operation of the input device by the user of the re-encryption key generation device 40.

The ciphertext attribute y' indicates an attribute that is allowed to decrypt a re-encrypted ciphertext $rct_{y'}$. The ciphertext attribute y' is assumed here to correspond to the key attribute x'. That is, it is assumed that the re-encrypted ciphertext $rct_{y'}$, generated based on the ciphertext attribute y' can be decrypted with the decryption key $dk_{x'}$ in which the key attribute x' is set. The ciphertext attribute y' is assumed here to be an n-dimensional vector.

(Step S53: Randomization Process)

The randomization unit 413 sets a random number individually in each of the decryption key $tdk_x$ and the tag $tg_\phi$ that are included in the decryption key $dk_x$, so as to generate a decryption key $tdk_x^\Lambda$ and a tag $tg_\phi^\Lambda$.

Specifically, the randomization unit 413 executes a TR and algorithm indicated in Formula 126, taking as input the parameter tpp, the decryption key $tdk_x$, and the tag $tg_\varphi$, so as to generate the decryption key $tdk_x{}^\wedge$ and the tag $tg_\varphi{}^\wedge$.

$TR$ and $(tpp, tdk_x, tg_\phi)$: [Formula 126]

parse $tdk_x = (x, k_0^*, k_1^*)$, $tg_\phi = k_2^*$, $\hat{s_1}, \hat{s_2}, \hat{\delta_1}, \hat{\eta_0} \xleftarrow{U} \mathbb{F}_q$, $\vec{\hat{\eta}}_1 \xleftarrow{U} \mathbb{F}_q^n, \vec{\hat{\eta}}_2 \xleftarrow{U} \mathbb{F}_q^2$, $\hat{s_0} = \hat{s_1} + \hat{s_2}$, $k_0^{*\wedge} = k_0^* + (0, -\hat{s_0}, 0, \hat{\eta_0}, 0)_{\mathbb{B}_0^*}$, $k_1^{*\wedge} = k_1^* + (\hat{s_1}\vec{e}_1 + \hat{\delta_1}x, 0^n, \vec{\hat{\eta}}_1, 0^n)_{\mathbb{B}_1^*}$, $k_2^{*\wedge} = k_2^* + (\hat{s_2}, 0^3, \vec{\hat{\eta}}_2, 0^2)_{\mathbb{B}_2^*}$, return $tdk_x^\wedge = (x, k_0^{*\wedge}, k_1^{*\wedge})$, $tg_\phi^\wedge = k_2^{*\wedge}$.

(Step S54: Encryption Key Generation Process)

The encryption key generation unit 414 encrypts the decryption key $tdk_x{}^\wedge$ by an attribute-based encryption scheme using the ciphertext attribute y', so as to generate an encryption key $act_{y'}$.

Specifically, the encryption key generation unit 414 executes an AEnc algorithm indicated in Formula 127, taking as input the parameter app, the ciphertext attribute y', and the decryption key $tdk_x{}^\wedge$, so as to generate the encryption key $act_{y'}$.

$AEnc(app, y', tdk_x^\wedge)$: [Formula 127]

$\omega, \zeta, \varphi_0 \xleftarrow{U} \mathbb{F}_q$, $c_3 = (\zeta, \omega y', 0^n, 0^n, \varphi_0)_{\mathbb{B}_3}$, $c_T = tdk_x^\wedge \cdot g_T^\zeta$, return $act_{y'} = (y', c_3, c_T)$.

(Step S55: Re-Encryption Key Output Process)

The re-encryption key output unit 415 outputs, as a re-encryption key $rk_{x,y'}$, the key attribute x, the ciphertext attribute y', the tag $tg_\varphi{}^\wedge$ generated in step S53, and the encryption key $act_{y'}$ generated in step S54 to the re-encryption device 50 in secrecy.

Figure 13:
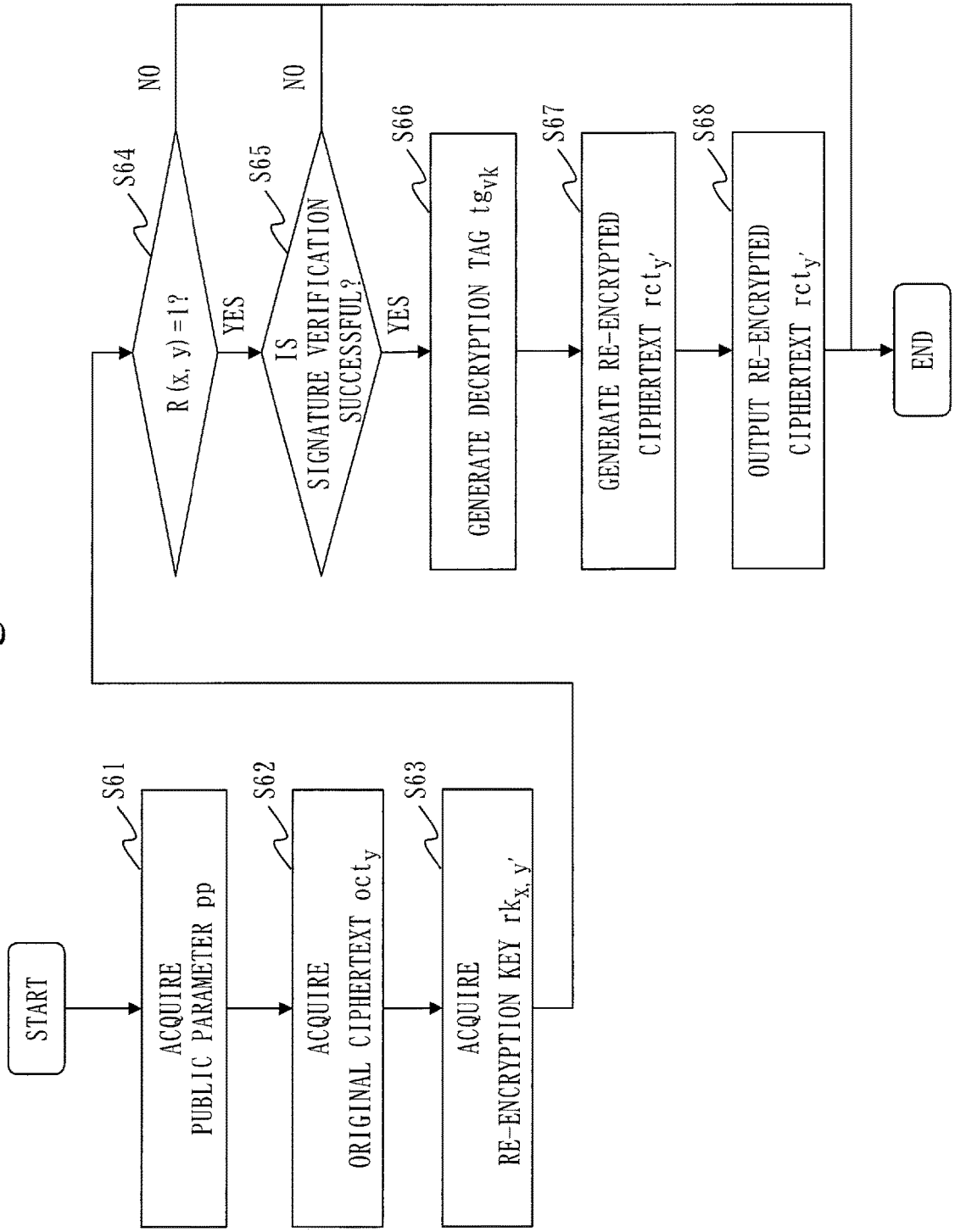
FIG. 13 is a flowchart of an REnc algorithm according to the first embodiment.

The REnc algorithm according to the first embodiment will be described with reference to FIG. 13.

The REnc algorithm is executed by the re-encryption device 50. The REnc algorithm is a probabilistic algorithm that takes as input the public parameter pp, the re-encryption key $rk_{x,y'}$, and the original ciphertext $oct_y$, and outputs a re-encrypted ciphertext $rct_{y'}$.

(Step S61: Public Parameter Acquisition Process)

The public parameter acquisition unit 511 acquires, via the communication interface 54, the public parameter pp that is made public by the key generation device 10.

(Step S62: Ciphertext Acquisition Process)

The ciphertext acquisition unit 512 acquires, via the communication interface 54, the original ciphertext $oct_y$ generated by the encryption device 20.

(Step S63: Re-Encryption Key Acquisition Process)

The re-encryption key acquisition unit 513 acquires, via the communication interface 54, the re-encryption key $rk_{x,y'}$ generated by the re-encryption key generation device 40.

(Step S64: Relation Verification Process)

The verification unit 514 determines whether or not the key attribute x included in the re-encryption key $rk_{x,y'}$ and the ciphertext attribute y included in the original ciphertext $oct_y$ satisfy a relation $R(x, y)=1$. By this, the verification unit 514 determines whether or not the original ciphertext $oct_y$ can be decrypted by the decryption key $dk_x$ on which the re-encryption key $rk_{x,y'}$ is based.

If $R(x, y)=1$ is satisfied, the verification unit 514 advances the process to step S65. On the other hand, if $R(x, y)=1$ is not satisfied, the verification unit 514 ends the process.

(Step S65: Signature Verification Process)

The verification unit 514 verifies the signature σ included in the original ciphertext $oct_y$ with the verification key vk included in the original ciphertext $oct_y$ by a verification algorithm for one-time signatures. As the verification algorithm for one-time signatures, an existing algorithm may be employed.

If the verification is successful, the verification unit 514 advances the process to step S66. On the other hand, if the verification is not successful, the verification unit 514 ends the process.

(Step S66: Decryption Tag Generation Process)

The decryption tag generation unit 515 transforms the tag $tg_\varphi{}^\wedge$ included in the re-encryption key $rk_{x,y'}$ to generate a decryption tag $tg_{vk}$.

Specifically, the decryption tag generation unit 515 executes a TTag algorithm indicated in Formula 128, taking as input the parameter tpp, the tag $tg_\varphi{}^\wedge$, and the verification key vk included in the original ciphertext $oct_y$, so as to generate the decryption tag $tg_{vk}$.

$TTag(tpp, tg_\phi^\wedge, vk)$: [Formula 128]

parse $tg_\phi^\wedge = k_2^* + \alpha$, $\delta_2 \xleftarrow{U} \mathbb{F}_q$, $tg_{vk} = k_2^{*vk} = tg_\phi^\wedge + (\delta_2(vk, -1), 0^6)_{\mathbb{B}_2^*}$, return $tg_{vk}$.

(Step S67: Re-Encryption Process)

The re-encryption unit 516 encrypts the original ciphertext $oct_y$, the encryption key $act_{y'}$ included in the re-encryption key $rk_{x,y'}$, and the decryption tag $tg_{vk}$ by an attribute-based encryption scheme using the ciphertext attribute y' included in the re-encryption key $rk_{x,y'}$, so as to generate a re-encrypted ciphertext $rct_{y'}$.

Specifically, the re-encryption unit 516 executes an AEnc algorithm indicated in Formula 129, taking as input the parameter app, the ciphertext attribute y', and data $oct_y \| act_{y'} \| tg_{vk}$ which is a concatenation of the original ciphertext $oct_y$, the encryption key $act_{y'}$, and the decryption tag $tg_{vk}$, so as to generate the re-encrypted ciphertext $rct_{y'}$.

$AEnc(app, y', oct_y \| act_{y'} \| tg_{vk})$: [Formula 129]

$\omega, \zeta, \varphi_0 \xleftarrow{U} \mathbb{F}_q$, $c_3 = (\zeta, \omega y', 0^n, 0^n, \varphi_0)_{\mathbb{B}_3}$, $c_T = oct_y \| act_{y'} \| tg_{vk} \cdot g_T^\zeta$, return $rct_{y'} = (y', c_3, c_T)$.

(Step S68: Re-Encrypted Ciphertext Output Process)

The re-encrypted ciphertext output unit 517 outputs the re-encrypted ciphertext $rct_{y'}$ generated in step S67 to the re-encrypted ciphertext decryption device 60.

Figure 14:
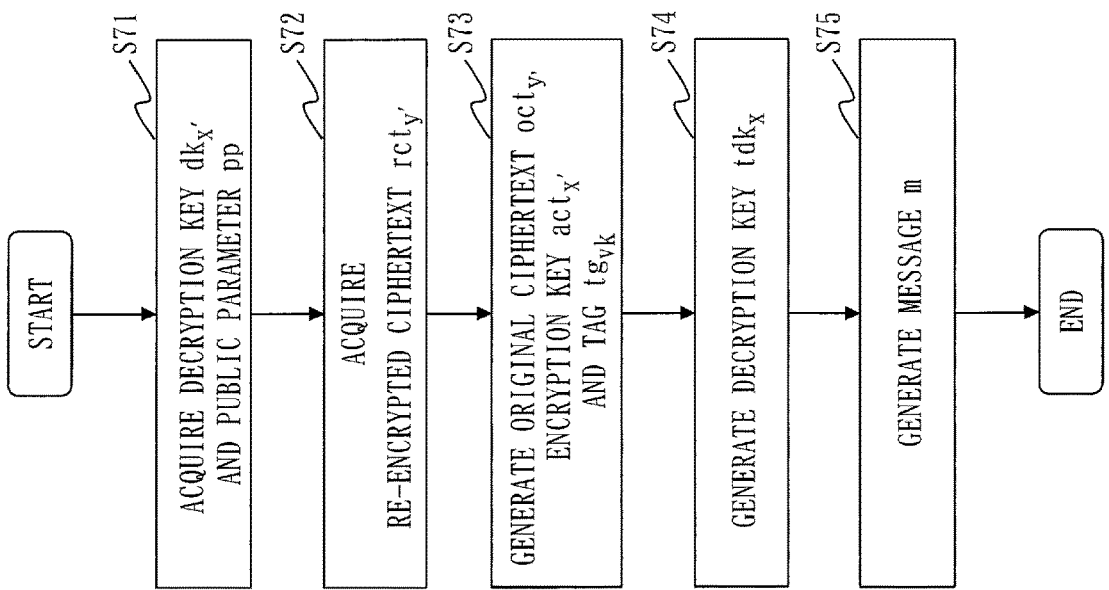
FIG. 14 is a flowchart of an RDec algorithm according to the first embodiment.

The RDec algorithm according to the first embodiment will be described with reference to FIG. 14.

The RDec algorithm is executed by the re-encrypted ciphertext decryption device 60. The RDec algorithm is an algorithm that takes as input the public parameter pp, the decryption key $dk_{x''}$, and the re-encrypted ciphertext $ra_{y'}$, and outputs the message m.

(Step S71: Decryption Key Acquisition Process)

The decryption key acquisition unit 611 acquires, via the communication interface 64, the decryption key $dk_{x'}$ and the public parameter pp that are generated by the key generation device 10.

(Step S72: Re-Encrypted Ciphertext Acquisition Process)

The re-encrypted ciphertext acquisition unit 612 acquires, via the communication interface 64, the re-encrypted ciphertext $rct_{y'}$ generated by the re-encryption device 50.

(Step S73: First Decryption Process)

The first decryption unit 613 decrypts the re-encrypted ciphertext $rct_{y'}$ with the decryption key $adk_{x'}$ in which the key attribute x' corresponding to the ciphertext attribute y' is set, so as to obtain the original ciphertext $oct_y$, the encryption key $act_{y'}$, and the decryption tag $tg_{vk}{}^\Lambda$.

Specifically, the first decryption unit 613 executes an ADec algorithm indicated in Formula 130, taking as input the parameter app, the decryption key $adk_{x'}$ included in the decryption key $dk_{x''}$ and the re-encrypted ciphertext $rct_{y'}$, so as to generate the original ciphertext $oct_y$, the encryption key $act_{y'}$, and the decryption tag $tg_{vk}$.

$ADec(app, adk_{x'}, rct_{y'})$:

parse $adk_{x'} = (x', k^*_3), rct_{y'} = (y', c_3, c_T)$, $K = e(c_3, k^*_3)$, return $oct_y \| act_{y'} \| tg_{vk} = c_T/K$ [Formula 130]

(Step S74: Second Decryption Process)

The second decryption unit 614 decrypts the encryption key $act_{y'}$ with the decryption key $adk_{x'}$, so as to obtain the decryption key $tdk_x{}^\Lambda$ in which the random number is set.

Specifically, the second decryption unit 614 executes an ADec algorithm indicated in Formula 131, taking as input the parameter app, the decryption key $adk_{x'}$ included in the decryption key $dk_{x''}$ and the encryption key $act_{y'}$, so as to generate the decryption key $tdk_x{}^\Lambda$.

$ADec(app, adk_{x'}, act_{y'})$:

parse $adk_{x'} = (x', k^*_3), act_{y'} = (y', c_3, c_T)$, $K = e(c_3, k^*_3)$, return $tdk_x{}^\Lambda = c_T/K$. [Formula 131]

(Step S75: Third Decryption Process)

The third decryption unit 615 decrypts the original ciphertext $oct_y$ to obtain the message m.

Specifically, the third decryption unit 615 executes a TDec algorithm indicated in Formula 132, taking as input the parameter tpp, the decryption key $tdk_x{}^\Lambda$, the decryption tag $tg_{vk}$, and the element $tct_{y,vk}$ included in the original ciphertext $oct_y$, so as to generate the message m.

$TDec(tpp, tdk_x{}^\Lambda, tg_{vk}, tct_{y,vk})$:

parse $tdk_x{}^\Lambda = (x, k^*_0{}^\Lambda, k^*_1{}^\Lambda), tg_{vk} = k^*_2{}^{vk}$, $tct_{y,vk} = (y, c_0, c_1, c_2, c_T)$, $K = e(c_0, k^*_0{}^\Lambda) \cdot e(c_1, k^*_1{}^\Lambda) \cdot e(c_2, k^*_2{}^{vk})$, return $m = c_T/K$. [Formula 132]

Effects of First Embodiment

As described above, the cryptographic system 1 according to the first embodiment realizes an attribute-based proxy-re-encryption scheme, using tag-added attribute-based encryption and tagless attribute-based encryption. The cryptographic system 1 according to the first embodiment encrypts a decryption key of tag-added attribute-based encryption using attribute-based encryption, so as to generate a re-encryption key. This eliminates the need to include a random matrix in a re-encrypted ciphertext, so that an increase in the size of a ciphertext entailed in re-encryption can be reduced.

In the cryptographic system 1 according to the first embodiment, the re-encryption key generation device 40 encrypts the decryption key $tdk_{\varphi}{}^\Lambda$ using the ciphertext attribute y' when generating the re-encryption key $rk_{x,y'}$. Therefore, the re-encryption device 50 cannot decrypt the original ciphertext $oct_y$ with the re-encryption key $rk_{x,y'}$.

In the cryptographic system 1 according to the first embodiment, the re-encryption key generation device 40 does not encrypt the tag $tg_{\varphi}{}^\Lambda$ when generating the re-encryption key $rk_{v,y'}$. Therefore, the re-encryption device 50 can generate the decryption tag $tg_{vk}$ by setting the verification key vk in the tag $tg_{\varphi}{}^\Lambda$. The decryption tag $tg_{vk}$ in which the verification key vk is set, instead of the tag $tg_{\varphi}{}^\Lambda$, is included in the re-encrypted ciphertext $rct_{y'}$ so that the re-encrypted ciphertext decryption device 60 can decrypt only a ciphertext in which the verification key vk is set.

Note that in the first embodiment, the verification key vk is set in the original ciphertext $oct_y$ and the decryption tag $tg_{vk}$. However, even when different data vk, instead of the verification key vk, is set in the original ciphertext $oct_y$ and the decryption tag $tg_{vk}$, it is possible to obtain the effect of allowing the re-encrypted ciphertext decryption device 60 to decrypt only a ciphertext in which the data vk is set.

*Other Configurations*

<First Variation>

In the first embodiment, the functional components of the key generation device 10, the encryption device 20, the original ciphertext decryption device 30, the re-encryption key generation device 40, the re-encryption device 50, and the re-encrypted ciphertext decryption device 60 are realized by software. However, as a first variation, the functional components may be realized by hardware. Differences in this first variation from the first embodiment will be described.

Figure 15:
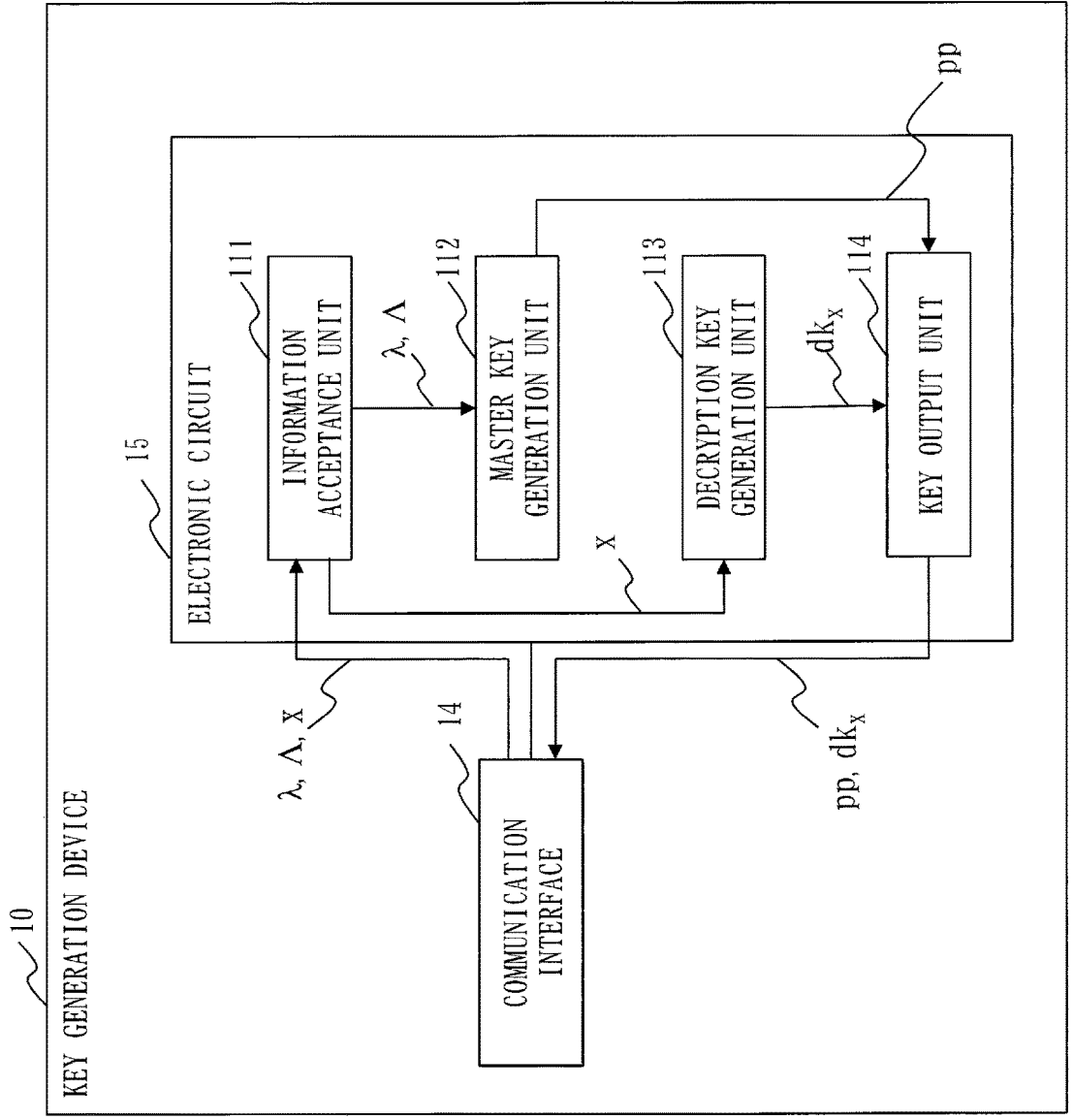
FIG. 15 is a configuration diagram of a key generation device 10 according to a first variation.

A configuration of a key generation device 10 according to the first variation will be described with reference to FIG. 15.

When the functions are realized by hardware, the key generation device 10 includes an electronic circuit 15 in place of the processor 11, the memory 12, and the storage 13. The electronic circuit 15 is a dedicated electronic circuit that realizes the functions of the memory 12, the storage 13, and the functional components of the key generation device 10.

Figure 16:
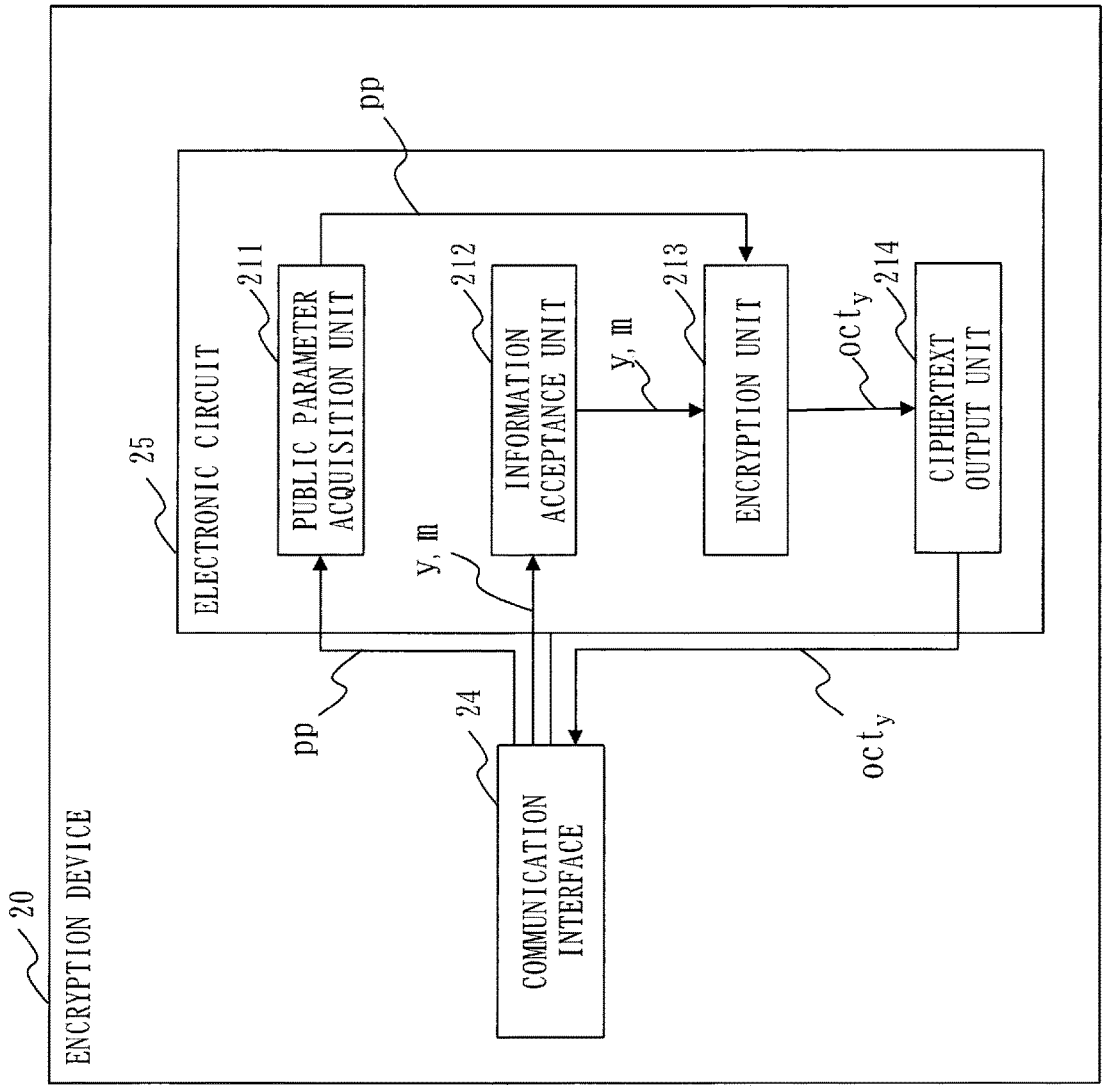
FIG. 16 is a configuration diagram of an encryption device 20 according to the first variation.

A configuration of an encryption device 20 according to the first variation will be described with reference to FIG. 16.

When the functions are realized by hardware, the encryption device 20 includes an electronic circuit 25 in place of the processor 21, the memory 22, and the storage 23. The electronic circuit 25 is a dedicated electronic circuit that realizes the functions of the memory 22, the storage 23, and the functional components of the encryption device 20.

Figure 17:
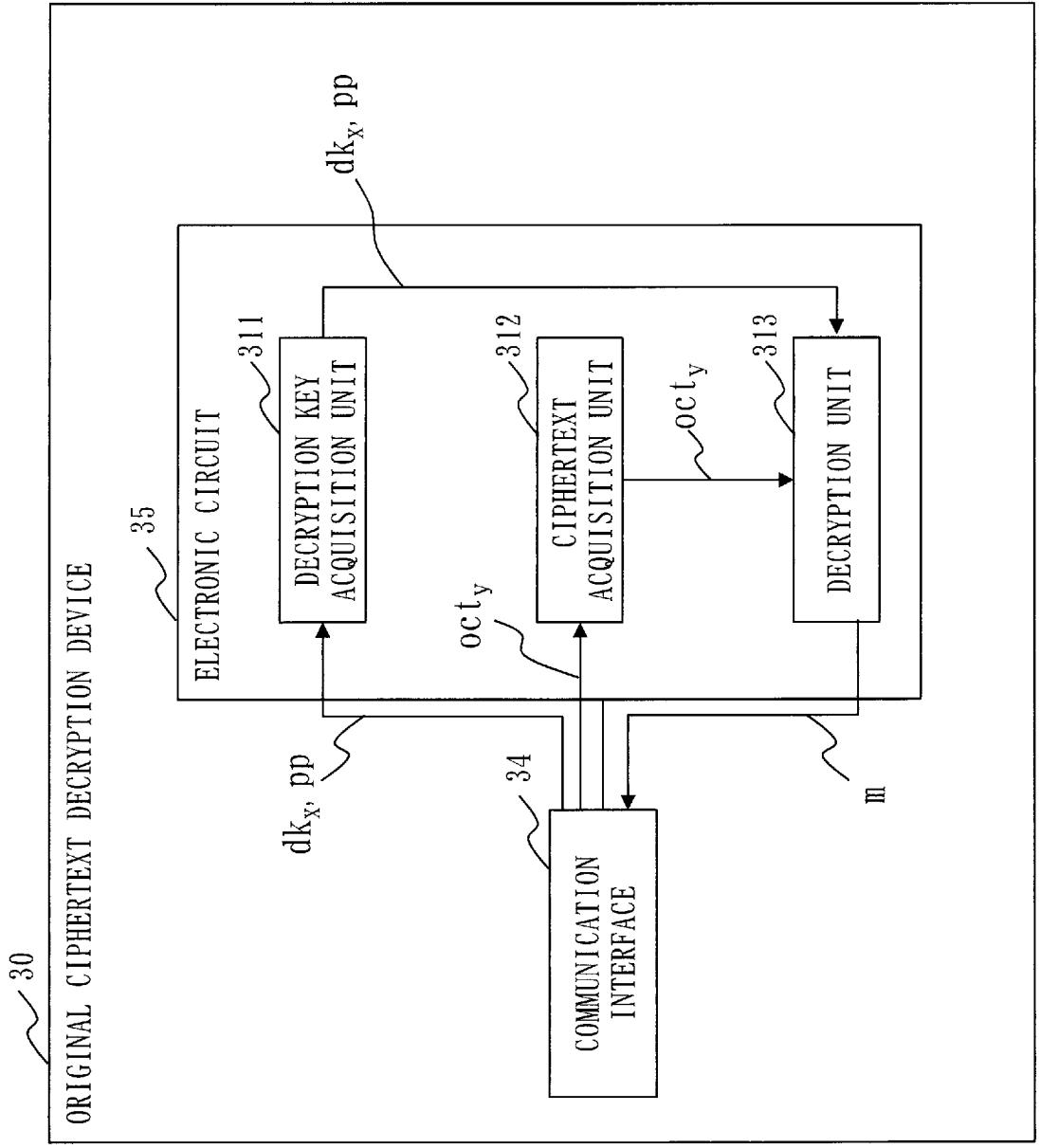
FIG. 17 is a configuration diagram of an original ciphertext decryption device 30 according to the first variation.

A configuration of an original ciphertext decryption device 30 according to the first variation will be described with reference to FIG. 17.

When the functions are realized by hardware, the original ciphertext decryption device 30 includes an electronic circuit 35 in place of the processor 31, the memory 32, and the storage 33. The electronic circuit 35 is a dedicated electronic circuit that realizes the functions of the memory 32, the storage 33, and the functional components of the original ciphertext decryption device 30.

Figure 18:
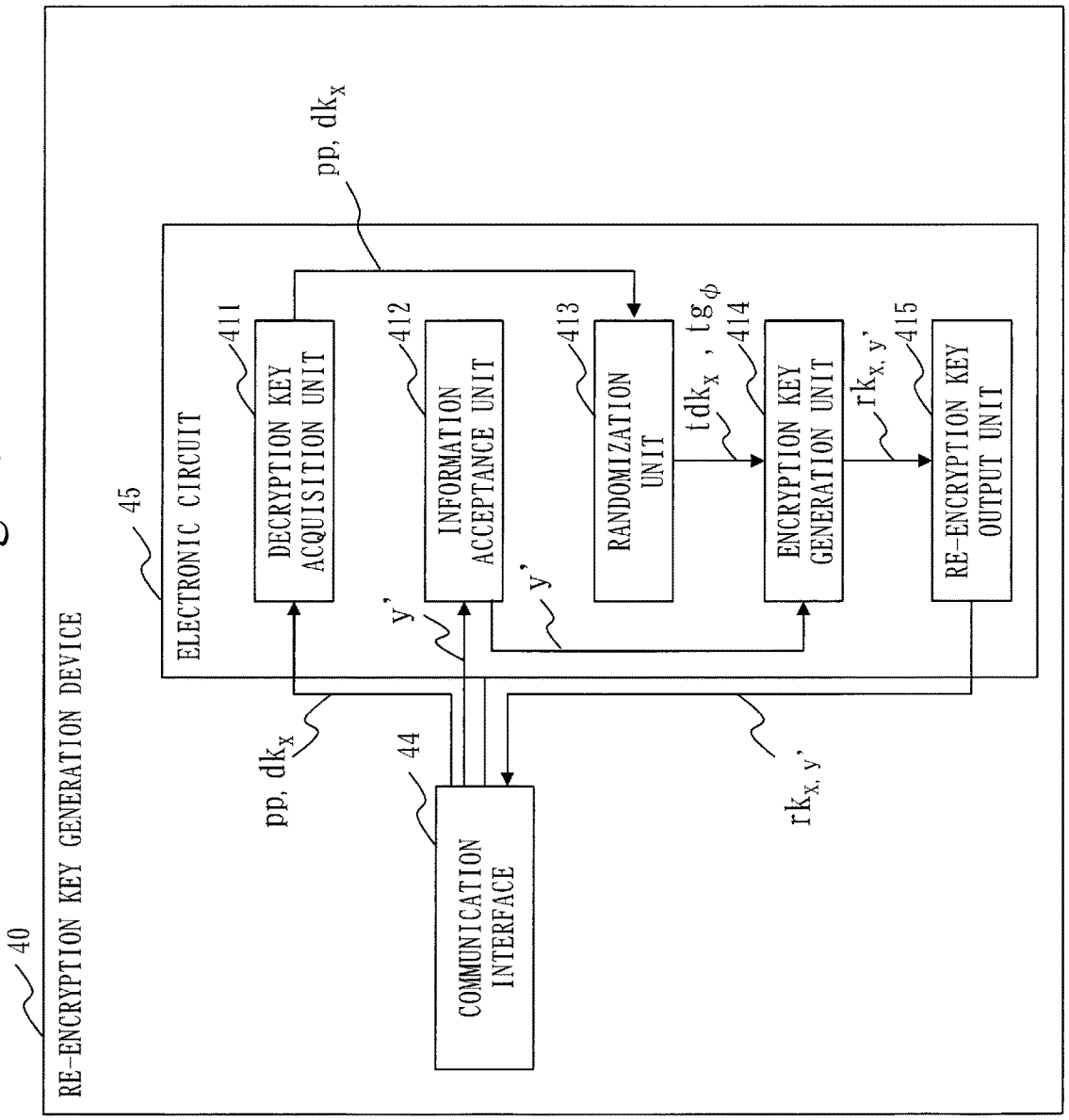
FIG. 18 is a configuration diagram of a re-encryption key generation device 40 according to the first variation.

A configuration of a re-encryption key generation device 40 according to the first variation will be described with reference to FIG. 18.

When the functions are realized by hardware, the re-encryption key generation device 40 includes an electronic circuit 45 in place of the processor 41, the memory 42, and the storage 43. The electronic circuit 45 is a dedicated electronic circuit that realizes the functions of the memory 42, and the storage 43, and the functional components of the re-encryption key generation device 40.

Figure 19:
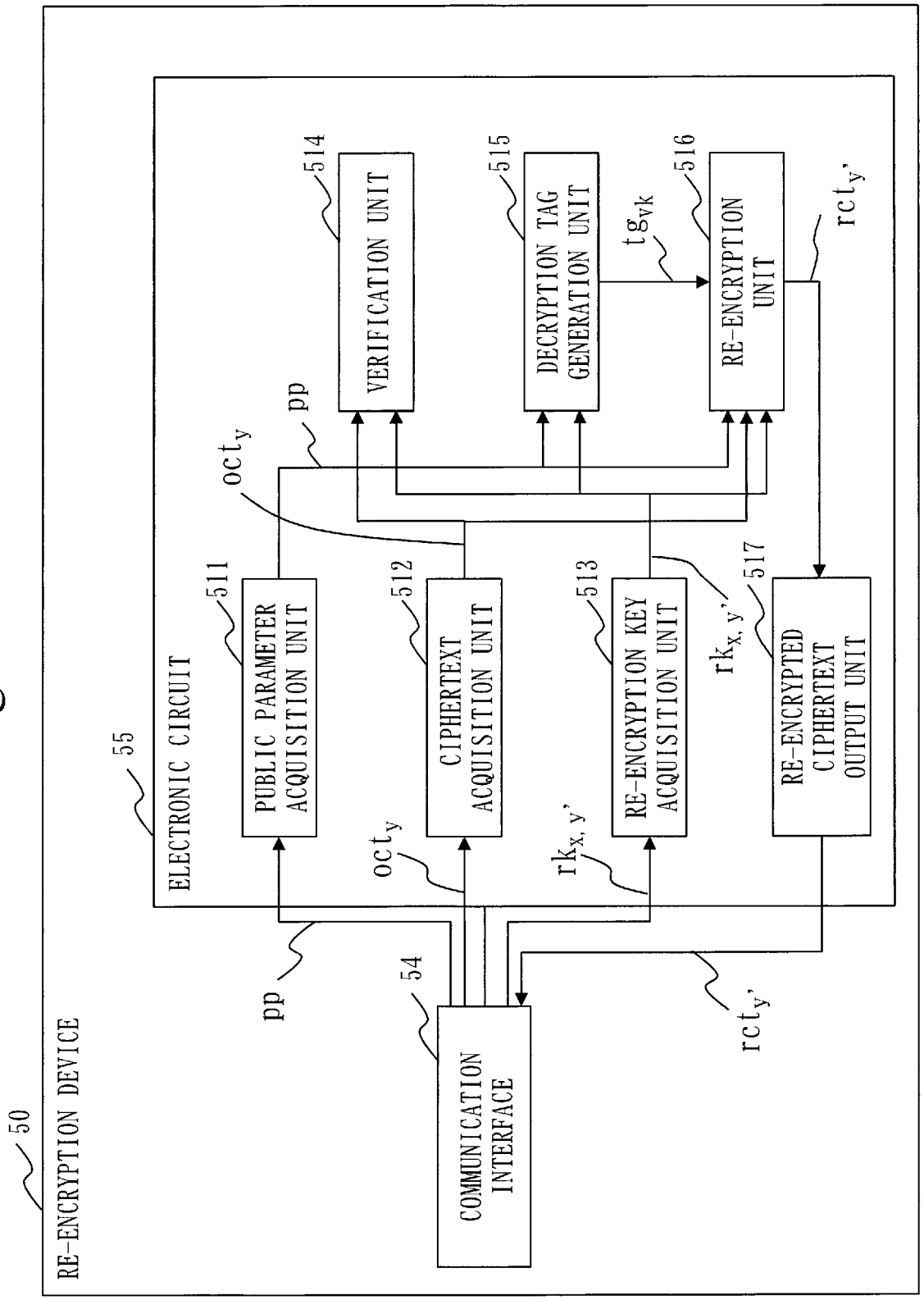
FIG. 19 is a configuration diagram of a re-encryption device 50 according to the first variation.

A configuration of a re-encryption device 50 according to the first variation will be described with reference to FIG. 19.

When the functions are realized by hardware, the re-encryption device 50 includes an electronic circuit 55 in place of the processor 51, the memory 52, and the storage 53. The electronic circuit 55 is a dedicated electronic circuit that realizes the functions of the memory 52, the storage 53, and the functional components of the re-encryption device 50.

Figure 20:
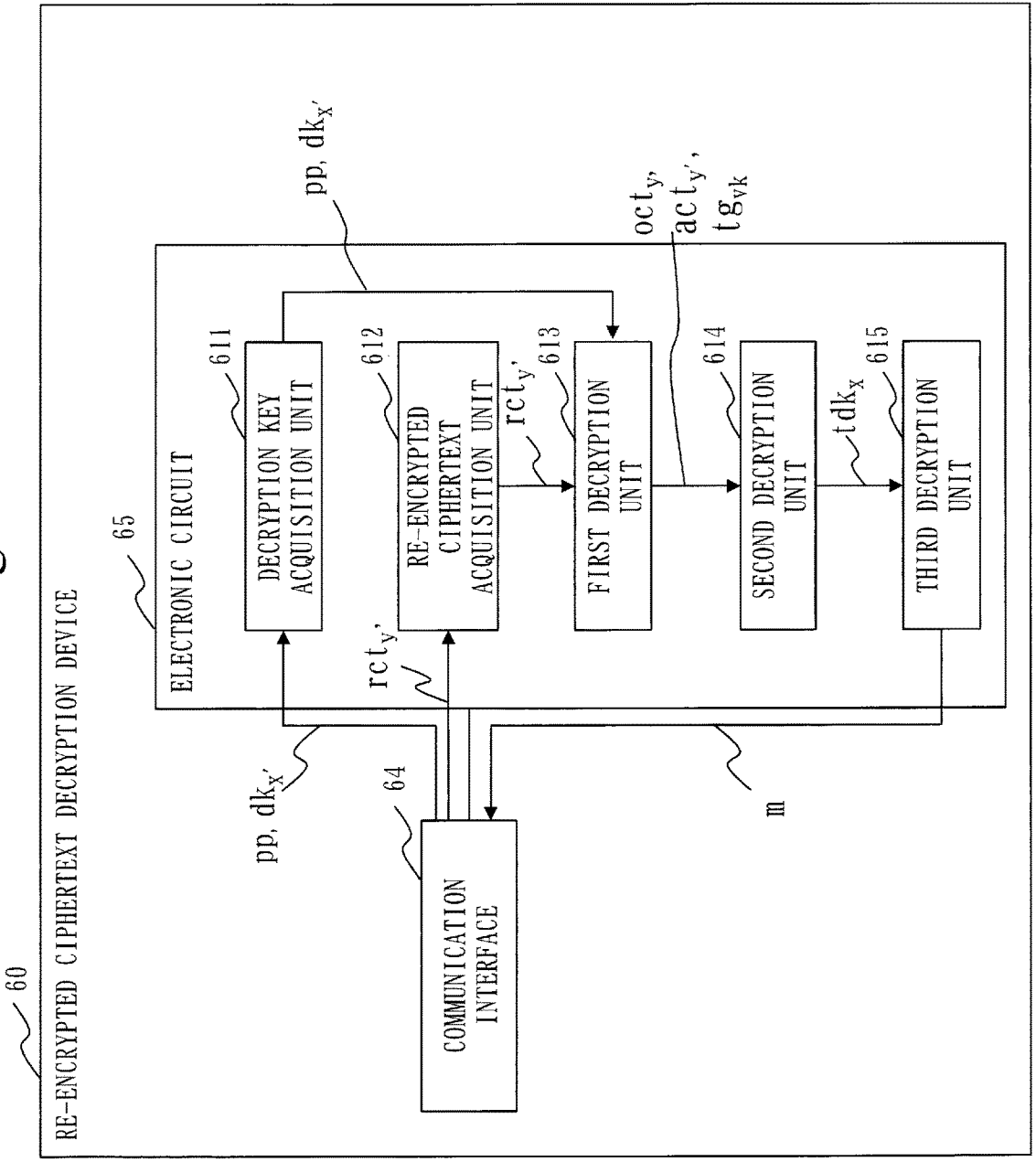
FIG. 20 is a configuration diagram of a re-encrypted ciphertext decryption device 60 according to the first variation.

A configuration of a re-encrypted ciphertext decryption device 60 according to the first variation will be described with reference to FIG. 20.

When the functions are realized by hardware, the re-encrypted ciphertext decryption device 60 includes an electronic circuit 65 in place of the processor 61, the memory 62, and the storage 63. The electronic circuit 65 is a dedicated electronic circuit that realizes the functions of the memory 62, the storage 63, and the functional components of the re-encrypted ciphertext decryption device 60.

Each of the electronic circuits 15, 25, 35, 45, 55, and 65 is assumed to be a single circuit, a composite circuit, a programmed processor, a parallel-programmed processor, a logic IC, a gate array (GA), an application specific integrated circuit (ASIC), and a field-programmable gate array (FPGA).

The functions of the functional components of the key generation device 10 may be realized by one electronic circuit 15, or the functions of the functional components may be distributed to and realized by a plurality of electronic circuits 15. Similarly, the functions of the functional complements of the encryption device 20, the original ciphertext decryption device 30, the re-encryption key generation device 40, the re-encryption device 50, and the re-encrypted ciphertext decryption device 60 may be realized by one electronic circuit 25, 35, 45, 55, and 65, respectively, or the functions of the functional components may be distributed to and realized by a plurality of electronic circuits 25, 35, 45, 55, and 65, respectively.

<Second Variation>

As a second variation, some of the functions may be realized by hardware, and the rest of the functions may be realized by software. That is, some functions of the functional components may be realized by hardware, and the rest of the functions may be realized by software.

Each of the processors 11, 21, 31, 41, 51, and 61, the memories 12, 22, 32, 42, 52, and 62, and the electronic circuits 15, 25, 35, 45, 55, and 65 is referred to as processing circuitry. That is, the functions of the functional components are realized by the processing circuitry.

REFERENCE SIGNS LIST

1: cryptographic system, 10: key generation device, 11: processor, 12: memory, 13: storage, 14: communication interface, 15: electronic circuit, 111: information acceptance unit, 112: master key generation unit, 113: decryption key generation unit, 114: key output unit, 20: encryption device, 21: processor, 22: memory, 23: storage, 24: communication interface, 25: electronic circuit, 211: public parameter acquisition unit, 212: information acceptance unit, 213: encryption unit, 214: ciphertext output unit, 30: original ciphertext decryption device, 31: processor, 32: memory, 33: storage, 34: communication interface, 35: electronic circuit, 311: decryption key acquisition unit, 312: ciphertext acquisition unit, 313: decryption unit, 40: re-encryption key generation device, 41: processor, 42: memory, 43: storage, 44: communication interface, 45: electronic circuit, 411: decryption key acquisition unit, 412: information acceptance unit, 413: randomization unit, 414: encryption key generation unit, 415: re-encryption, key output unit, 50: re-encryption device, 51: processor, 52: memory, 53: storage, 54: communication interface, 55: electronic circuit, 511: public parameter acquisition unit, 512: ciphertext acquisition unit, 513: re-encryption key acquisition unit, 514: verification unit, 515: decryption tag generation unit, 516: re-encryption unit, 517: re-encrypted ciphertext output unit, 60: re-encrypted ciphertext decryption device, 61: processor, 62: memory, 63: storage, 64: communication interface, 65: electronic circuit, 611: decryption key acquisition unit, 612: re-encrypted ciphertext acquisition unit, 613: first decryption unit, 614: second decryption unit, 615: third decryption unit

The invention claimed is:

1. A re-encryption key generation device for generating a re-encryption key for use by a proxy re-encryption device in an attribute-based proxy re-encryption scheme to allow decryption authority for a ciphertext to change without decrypting the ciphertext comprising:

processing circuitry to:

set a first random number in a decryption key tdkx in which a key attribute x is set and set a second random number in a tag $tg_\varphi$, used to decrypt a ciphertext with the decryption key tdkx, so as to generate a decryption key $tdk_x^\wedge$ and a tag $tg_\varphi^\wedge$;

encrypt the generated decryption key $tdk_x^\wedge$ by an attribute-based encryption scheme using a ciphertext attribute y', so as to generate an encryption key $act_{y'}$; and output, to the proxy re-encryption device, a re-encryption key $rk_{x,y'}$ including the encryption key $act_{y'}$ and the tag $tg_\varphi^\wedge$ that are generated such that the proxy re-encryption device may generate a re-encrypted ciphertext.

2. The re-encryption key generation device according to claim 1, wherein the re-encryption key $rk_{x,y'}$ is a key for generating, from an original ciphertext $oct_y$ in which a ciphertext attribute y corresponding to the key attribute x is set, a re-encrypted ciphertext $rct_{y'}$ that can be decrypted with a decryption key $adk_{x'}$ in which a key attribute x' corresponding to the ciphertext attribute y' is set.

3. The re-encryption key generation device according to claim 1, wherein the processing circuitry
generates the decryption key $tdk_x^\wedge$ and the tag $tg_\varphi^\wedge$, as indicated in Formula 1, and
generates the encryption key $act_{y'}$, as indicated in Formula 2

$$k_0^{*\wedge} = k_0^* + (0, -\hat{s_0}, 0, \hat{\eta_0}, 0)_{B_0^*},$$ [Formula 1]

$$k_1^{*\wedge} = k_1^* + \left(\hat{s_1}\overset{r}{e_1} + \hat{\delta_1}x, 0^n, \overset{r}{\hat{\eta_1}}, 0^n\right)_{B_1^*},$$

$$k_2^{*\wedge} = k_2^* + \left(\hat{s_2}, 0^3, \overset{r}{\hat{\eta_2}}, 0^2\right)_{B_2^*},$$

$$tdk_x^\wedge = (x, k_0^{*\wedge}, k_1^{*\wedge}), tg_\varphi^\wedge = k_2^{*\wedge}$$

where $\hat{s_1}, \hat{s_2}, \hat{\delta_1}, \hat{\eta_0} \overset{U}{\leftarrow} F_q,$ $\overset{r}{\hat{\eta_1}} \overset{U}{\leftarrow} F_q^n, \overset{r}{\hat{\eta_2}} \overset{U}{\leftarrow} F_q^2,$ $\hat{s_0} = \hat{s_1} + \hat{s_2},$ $k_0^* = (1, -s_0, 0, \eta_0, 0)_{B_0^*},$ $k_1^* = \left(s_1 \overset{r}{e_1} + \delta_1 x, 0^n, \overset{r}{\eta_1}, 0^n\right)_{B_1^*},$ $k_2^* = \left(s_2, 0^3, \overset{r}{\eta_2}, 0^2\right)_{B_2^*},$ $tdk_x = (x, k_0^*, k_1^*), tg_\varphi = k_2^*,$ $s_1, s_2, \delta_1, \eta_0 \overset{U}{\leftarrow} F_q,$ $\overset{r}{\eta_1} \overset{U}{\leftarrow} F_q^n, \overset{r}{\eta_2} \overset{U}{\leftarrow} F_q^2,$ $s_0 = s_1 + s_2$ $$c_3 = (\zeta, \omega y', 0^n, 0^n, \varphi_0)_{B_3},$$ [Formula 2]

$c_T = tdk_x^\wedge \cdot g_T^\zeta,$ $act_{y'} = (y', c_3, c_T)$ where $\omega, \zeta, \varphi_0 \overset{U}{\leftarrow} F_q.$ 4. The re-encryption key generation device according to claim 2, wherein the processing circuitry
generates the decryption key $tdk_x^\wedge$ and the tag $tg_\varphi^\wedge$, as indicated in Formula 3, and
generates the encryption key $act_{y'}$, as indicated in Formula 4

$$k_0^{*\wedge} = k_0^* + (0, -\hat{s_0}, 0, \hat{\eta_0}, 0)_{B_0^*},$$ [Formula 3]

$$k_1^{*\wedge} = k_1^* + \left(\hat{s_1}\overset{r}{e_1} + \hat{\delta_1}x, 0^n, \overset{r}{\hat{\eta_1}}, 0^n\right)_{B_1^*},$$

$$k_2^{*\wedge} = k_2^* + \left(\hat{s_2}, 0^3, \overset{r}{\hat{\eta_2}}, 0^2\right)_{B_2^*},$$

$$tdk_x^\wedge = (x, k_0^{*\wedge}, k_1^{*\wedge}), tg_\varphi^\wedge = k_2^{*\wedge}$$

where $\hat{s_1}, \hat{s_2}, \hat{\delta_1}, \hat{\eta_0} \overset{U}{\leftarrow} F_q,$ $\overset{r}{\hat{\eta_1}} \overset{U}{\leftarrow} F_q^n, \overset{r}{\hat{\eta_2}} \overset{U}{\leftarrow} F_q^2,$ $\hat{s_0} = \hat{s_1} + \hat{s_2},$ $k_0^* = (1, -s_0, 0, \eta_0, 0)_{B_0^*},$ $k_1^* = \left(s_1 \overset{r}{e_1} + \delta_1 x, 0^n, \overset{r}{\eta_1}, 0^n\right)_{B_1^*},$ $k_2^* = \left(s_2, 0^3, \overset{r}{\eta_2}, 0^2\right)_{B_2^*},$ $tdk_x = (x, k_0^*, k_1^*), tg_\varphi = k_2^*,$ $s_1, s_2, \delta_1, \eta_0 \overset{U}{\leftarrow} F_q,$ $\overset{r}{\eta_1} \overset{U}{\leftarrow} F_q^n, \overset{r}{\eta_2} \overset{U}{\leftarrow} F_q^2,$ $s_0 = s_1 + s_2$ $$c_3 = (\zeta, \omega y', 0^n, 0^n, \varphi_0)_{B_3},$$ [Formula 4]

$c_T = tdk_x^\wedge \cdot g_T^\zeta,$ $act_{y'} = (y', c_3, c_T)$ where $\omega, \zeta, \varphi_0 \overset{U}{\leftarrow} F_q.$ 5. A re-encryption device comprising:
processing circuitry to:
acquire an original ciphertext $oct_y$ in which a ciphertext attribute y is set;
acquire a re-encryption key $rk_{x,y'}$ including an encryption key $act_{y'}$ and a tag $tg_\varphi^\wedge$, the encryption key $act_{y'}$ being generated by setting a first random number in a decryption key $tdk_x$ in which a key attribute x corresponding to the ciphertext attribute y is set and then encrypting the decryption key $tdk_x$ by an attribute-based encryption scheme using a ciphertext attribute y', the tag $tg_\varphi$ being obtained by setting a second random number in a tag $tg_\varphi$ used to decrypt a ciphertext with the decryption key $tdk_x$;
transform the tag $tg_\varphi'$ included in the acquired re-encryption key $rk_{x,y'}$, so as to generate a decryption tag $tg_{vk}$; and
encrypt the acquired original ciphertext $oct_y$, the encryption key $act_{y'}$ included in the acquired re-encryption key $rk_{x,y'}$, and the generated decryption tag $tg_{vk}$ by an attribute-based encryption scheme using the ciphertext attribute y', so as to generate a re-encrypted ciphertext $rct_{y'}$.

6. The re-encryption device according to claim 5, wherein data vk is set in the original ciphertext $oct_y$, and
wherein the processing circuitry generates the decryption tag tgvk by setting the data vk in the tag $tg_\varphi$.

7. The re-encryption device according to claim 5, wherein the processing circuitry
generates the decryption tag $tg_{vk}$, as indicated in Formula 5, and
generates the re-encrypted ciphertext $rct_{y'}$, as indicated in Formula 6

$$tg_{vk} = tg_\varphi^\wedge + (\delta_2(vk, -1), 0^6)_{B_2^*},$$ [Formula 5]

where $\delta_2 \overset{U}{\leftarrow} F_q,$ $tg_\varphi^\wedge = \left(s_2, 0^3, \overset{r}{\hat{\eta_2}}, 0^2\right)_{B_2^*} + \left(\hat{s_2}, 0^3, \overset{r}{\hat{\eta_2}}, 0^2\right)_{B_2^*},$ $s_2, \hat{s_2} \overset{U}{\leftarrow} F_q, \overset{r}{\eta_2}, \overset{r}{\hat{\eta_2}} \overset{U}{\leftarrow} F_q^2$ $$c_3 = (\zeta, \omega y', 0^n, 0^n, \varphi_0)_{B_3},$$ [Formula 6]

$c_T = oct_y Pact_{y'} Ptg_{vk} \cdot g_T^\zeta,$ $rct_{y'} = (y', c_3, c_T)$ where $\omega, \zeta, \varphi_0 \overset{U}{\leftarrow} F_q.$ 8. The re-encryption device according to claim 6, wherein the processing circuitry
generates the decryption tag $tg_{vk}$, as indicated in Formula 7, and
generates the re-encrypted ciphertext $rct_{y'}$, as indicated in Formula 8

$$tg_{vk} = tg_{\phi}^{\wedge} + (\delta_2(vk, -1), 0^6)_{B_2^*},$$ [Formula 7]

where $$\delta_2 \xleftarrow{U} F_q,$$

$$tg_{\phi}^{\wedge} = (s_2, 0^3, \vec{\eta}_2, 0^2)_{B_2^*} + (\hat{s}_2, 0^3, \vec{\eta}_2^{\wedge}, 0^2)_{B_2^*},$$

$$s_2, \hat{s}_2 \xleftarrow{U} F_q, \vec{\eta}_2, \vec{\eta}_2^{\wedge} \xleftarrow{U} F_q^2$$

$$c_3 = (\zeta, \omega y', 0^n, 0^n, \varphi_0)_{B_3},$$ [Formula 8]

$$c_T = oct_y Pact_{y'} Ptg_{vk} \cdot g_T^\zeta,$$

$$rct_{y'} = (y', c_3, c_T)$$

where $$\omega, \zeta, \varphi_0 \xleftarrow{U} F_q.$$

9. A re-encrypted ciphertext decryption device comprising:
processing circuitry to:
acquire a re-encrypted ciphertext $rct_{y'}$ generated by encrypting an original ciphertext $oct_y$ in which a ciphertext attribute y is set, an encryption key $act_{y'}$, and a decryption tag $tg_{vk}$ by an attribute-based encryption scheme using a ciphertext attribute y', the encryption key $act_{y'}$ being generated by setting a first random number in a decryption key $tdk_x$ in which a key attribute x corresponding to the ciphertext attribute y is set, and then encrypting the decryption key $tdk_x$ by an attribute-based encryption scheme using a ciphertext attribute y', the decryption tag $tg_{vk}$ being generated from a tag $tg_\phi$ used to decrypt a ciphertext with the decryption key $tdk_x$;
decrypt the acquired re-encrypted ciphertext $rct_{y'}$ with a decryption key $adk_{x'}$ in which a key attribute x' corresponding to the ciphertext attribute y' is set, so as to generate the original ciphertext $oct_y$, the encryption key $act_{y'}$, and the decryption tag $tg_{vk}$;
decrypt the generated encryption key $act_{y'}$ with the decryption key $adk_{x'}$, so as to generate a decryption key $tdk_x^{\wedge}$ in which a second random number is set; and
decrypt the original ciphertext $oct_y$, using the generated decryption key $tdk_x^{\wedge}$ in which the second random number is set and the decryption tag $tg_{vk}$.

10. The re-encrypted ciphertext decryption device according to claim 9, wherein the processing circuitry
acquires the re-encrypted ciphertext $rct_{y'}$ indicated in Formula 9,
generates the original ciphertext $oct_y$, the encryption key $act_{y'}$, and the decryption tag $tg_{vk}$ as indicated in Formula 10,
generates the decryption key $tdk_x$, as indicated in Formula 11, and
decrypts the original ciphertext $oct_y$, as indicated in Formula 12

$$c_3 = (\zeta, \omega y', 0^n, 0^n, \varphi_0)_{B_3},$$ [Formula 9]

$$c_T = oct_y \| act_{y'} \| tg_{vk} \cdot g_T^\zeta,$$

$$rct_{y'} = (y', c_3, c_T)$$

where $$\omega, \zeta, \varphi_0 \xleftarrow{U} F_q,$$

$$K = e(c_3, k_3^*),$$ [Formula 10]

$$oct_y \| act_{y'} \| tg_{vk} = c_T / K$$

where $$adk_x = (x, k_3^*),$$

$$k_3^* = (1, -s_3 x, 0^n, \vec{\eta}_3, 0)_{B_3^*},$$

$$s_3 \xleftarrow{U} F_q, \vec{\eta}_3 \xleftarrow{U} F_q^n$$

$$K = e(c_3, k_3^*),$$ [Formula 11]

$$tdk_x^{\wedge} = c_T / K$$

where $$act_{y'} = (y', c_3, c_T),$$

$$c_3 = (\zeta, \omega y', 0^n, 0^n, \varphi_0)_{B_3},$$

$$c_T = tdk_x^{\wedge} \cdot g_T^\zeta,$$

$$\omega, \zeta, \varphi_0 \xleftarrow{U} F_q$$

$$K = e(c_0, k_0^{*\wedge}) \cdot e(c_1, k_1^{*\wedge}) \cdot e(c_2, k_2^{*vk}),$$ [Formula 12]

$$m = c_T / K$$

where $$tdk_x^{\wedge} = (x, k_0^{*\wedge}, k_1^{*\wedge}), tg_{vk} = k_2^{*vk},$$

$$oct_y = tct_{y,vk} = (y, c_0, c_1, c_2, c_T),$$

$$k_0^{*\wedge} = (1, s_0, 0, \eta_0, 0)_{B_0^*} + (0, -\hat{s}_0, 0, \hat{\eta}_0, 0)_{B_0^*},$$

$$k_1^{*\wedge} = (s_1 \vec{e}_1 + \delta_1 x, 0^n, \vec{\eta}_1, 0^n)_{B_1^*} + (\hat{s}_1 \vec{e}_1 + \hat{\delta}_1 x, 0^n, \vec{\eta}_1^{\wedge}, 0^n)_{B_1^*},$$

$$k_2^{*\wedge} = (s_2, 0^3, \vec{\eta}_2, 0^2)_{B_2^*} + (\hat{s}_2, 0^3, \vec{\eta}_2^{\wedge}, 0^2)_{B_2^*},$$

$$s_1, s_2, \delta_1, \eta_0, \hat{s}_1, \hat{s}_2, \hat{\delta}_1, \hat{\eta}_0 \xleftarrow{U} F_q,$$

$$\vec{\eta}_2, \vec{\eta}_1^{\wedge} \xleftarrow{U} F_q^n, \vec{\eta}_2, \vec{\eta}_2^{\wedge} \xleftarrow{U} F_q^2,$$

$$c_0(\zeta, \omega, 0, 0, \varphi_0)_{B_0},$$

$$c_1(\omega y, 0^{2n}, \vec{\varphi}_1)_{B_1},$$

$$c_2(\omega(1, vk), 0^4, \vec{\varphi}_2)_{B_2},$$

$$c_T = m \cdot g_T^\zeta,$$

$$\omega, \zeta, \varphi_0 \xleftarrow{U} F_q, \vec{\varphi}_1 \xleftarrow{U} F_q^n, \vec{\varphi}_2 \xleftarrow{U} F_q^2.$$

11. A cryptographic system comprising:
a key generation device to generate a decryption key $dk_x$ having a tag-added decryption key and a decryption key $adk_x$, the tag-added decryption key including a decryption key $tdk_x$ in which a key attribute x is set and a tag $tg_\phi$ used to decrypt a ciphertext with the decryption key $tdk_x$, the decryption key $adk_x$ being a key in which the key attribute x is set;
an encryption device to generate an original ciphertext $oct_y$ in which a ciphertext attribute y corresponding to the key attribute x is set and which can be decrypted with the tag-added decryption key generated by the key generation device; and
a re-encryption key generation device to encrypt the decryption key $tdk_x$ generated by the key generation device by an attribute-based encryption scheme using a ciphertext attribute y', so as to generate a re-encryption key $rk_{x,y'}$, which is a key for generating a re-encrypted ciphertext $rct_{y'}$ that can be decrypted with a decryption key $adk_{x'}$ in which a key attribute x' corresponding to the ciphertext attribute y' is set.

\* \* \* \* \*